United States Patent Office 3,637,910
Patented Jan. 25, 1972

3,637,910
PROCESS FOR THE PREPARATION OF FIBER-FORMING AROMATIC POLYESTERS OF LOW FREE CARBOXYL GROUP CONTENTS
Takeo Shima, Takanori Urasaki, and Isao Oka, Iwakuni-shi, Japan, assignors to Teijin Limited, Osaka, Japan
No Drawing. Filed Sept. 5, 1969, Ser. No. 855,778
Claims priority, application Japan, Sept. 9, 1968, 43/64,831; Apr. 12, 1969, 44/28,526
Int. Cl. C08g 17/04, 17/08, 39/10
U.S. Cl. 260—860
24 Claims

ABSTRACT OF THE DISCLOSURE

High molecular fiber-forming aromatic polyesters having a low free carboxyl content and a high resistance to wet heat are prepared by adding a compound such as diglycol esters of oxalic acid, substituted or unsubstituted malonic acid, or polymers of such diglycol esters, and substituted or unsubstituted cyclic glycol esters of oxalic acid to a molten mass of an aromatic polyester derived from an aromatic dicarboxylic or its lower aliphatic esters such as terephthalic acid and a dihydric alcohol such as ethylene glycol, such molten mass of the polyester having an intrinsic viscosity of at least 0.3, and subjecting the molten mass of aromatic polyester to which conditions as will allow further progress of the polycondensation reaction.

---

This invention relates to a process for the preparation of aromatic polyesters which can be processed to form fiber, film, and other shaped products and particularly to the preparation of such aromatic polyesters of low free carboxyl group content.

As is well known, polyesters are conventionally produced by reacting dibasic acids or lower aliphatic esters thereof with dihydric alcohols to form monomeric or low grade polymeric dihydric alcohol esters of the dibasic acids, and further heating the same in the presence of a suitable catalyst to effect polycondensation of the products, while eliminating the dihydric alcohols from the reaction system. Taking the preparation of polyethylene terephthalate for example according to the long-practiced conventional two-stage process, terephthalic acid or a lower alkyl ester thereof is first reacted with ethylene glycol to form bis-β-hydroxyethyl terephthalate (monomer) or its lower polymer, and then the reaction product is heated in the presence of a suitable catalyst to be converted to high molecular weight polyethylene terephthalate.

However, in the conventional synthesis method of polyesters as above-described, hydroxyl groups at the polymer termini gradually decrease with the progress of the polycondensation reaction. Furthermore, since the reaction is normally conducted at 200°–350° C., preferably at 260°–320° C., the main chain of the polymer is broken due to thermal decomposition reaction occurring in addition to the desired polycondensation, and consequently hydroxyl groups gradually decrease at the polymer termini while carboxyl groups increase. This decrease of hydroxyl groups and increase of carboxyl groups invites gradual reduction in polymerization rate.

It is also known to produce fiber-forming aromatic polyesters, using as the aromatic bifunctional carboxylic acid component, for example, such aromatic dicarboxylic acids as 2,6-dimethylterephthalic,
homoterephthalic,
naphthalene-1,5-dicarboxylic,
naphthalene-2,6-dicarboxylic,
diphenylether-4,4'-dicarboxylic,
diphenylmethane-4,4'-dicarboxylic,
α,β-diphenoxyethane-4,4'-dicarboxylic,
diphenylsulfone-4,4'-dicarboxylic and
diphenyl-4,4'-dicarboxylic acids, or aromatic hydroxycarboxylic acids such as β-hydroxyethoxybenzoic and β-hydroxyethoxyvanillic acids, or lower aliphatic esters of the foregoing. Such aromatic bifunctional carboxylic acid component also is reacted with a dihydroxy compound such as ethylene glycol. The reaction conditions employed in the latter process are similar to those described in the foregoing. Accordingly, fiber-forming aromatic polyesters can be obtained regardless of which of the foregoing acid components is employed, but in any case a considerable amount of free carboxyl groups is contained in the resulting polyester, from the reasons already mentioned. The content of free carboxyl groups varies, depending on such factors as type of catalyst and stabilizer employed for the preparation of aromatic polyesters, reaction conditions of the polycondensation, degree of polymerization of polyester, etc. Normally the content is higher under higher polycondensation temperature and longer polymerization time. Since, obviously, a higher polycondensation temperature and longer reaction time are required for the preparation of high molecular weight polyesters, increase in free carboxyl group content of highly polymerized polyesters is unavoidable. Thus, conventional commercial polyethylene terephthalate having an intrinsic viscosity $[\eta]$ ranging from 0.6 to 0.9 normally contains a carboxyl group content of approximately 30–50 equivalents/$10^6$ g. of polyethylene terephthalate polymer. The above intrinsic viscosity $[\eta]$ is calculated from the viscosity of ortho-chlorophenol solution of polyethylene terephthalate, measured at 35° C. Unless otherwise specified, this definition applies to intrinsic viscosities hereafter referred to in this specification, including those of aromatic polyesters other than polyethyleneterephthalate.

The rate of hydrolysis of the polyester increases, as the free carboxyl group content of the polyester becomes greater. Consequently, polyesters of higher free carboxyl group contents exhibit inferior resistance to wet heat, compared with those of less free carboxyl group content. Therefore, particularly the polyester fibers, which are used under high temperature and wet conditions, such as tire cord, must be prepared from fiber-forming aromatic polyesters of less free carboxyl group content.

Known processes for making such aromatic polyesters of less free carboxyl group content include, for example, the following:

(a) Addition of a copper salt of an organic acid and a reducing substance, such as KI, to the polymerization reaction system.

(b) Addition of an epoxy compound, such as phenylglycidyl ether, to the polymerization reaction system.

(c) A process wherein the polycondensation of the polyester is conducted in the manner of normal melt polymerization until the intrinsic viscosity of the product polymer reaches approximately 0.6, and the resulting polyester is cooled and formed into chips or powder, followed by further polycondensation reaction in solid phase, at a temperature lower than the melting point of the polyester by approximately 10–60° C., in vacuum or inert gaseous current, to form a polyeser of high degree of polymerization. (Hereinafter this process is referred to as "solid phase" polymerization method.)

However, none of the above three processes is completely satisfactory for practical use, in that process (a) causes deterioration in thermal stability of the product polyester; process (b) shows only minor effect of decreasing the free carboxyl group content of the polyester and furthermore causes introduction of unstable compounds into the main chain of the polyester, and process (c) requires a long time for the solid phase polymerization, in which it is difficult to reduce the carboxyl group content to 20 equivalents/$10^6$ g. of the polymer, particularly to 15 equivalents/$10^6$ g. of the polymer or less.

Accordingly, therefore, the main object of the present invention is to provide a process whereby the free carboxyl group content can be quickly reduced to, for example, 15 equivalents/$10^6$ g. of polymer or even less, and furthermore whereby fiber-forming, high polymerization degree aromatic polyesters having a high thermal stability can be obtained through the procedures similar to ordinary polymerization operations.

Another object of this invention is to provide a process for the preparation of fiber-forming, high polymerization degree aromatic polyesters of high resistance to wet heat (i.e. showing little deterioration under wet heat).

Still other objects and advantages of the invention will become apparent from the following descriptions.

The foregoing objects and advantages of the invention are achieved by the process of this invention, which comprises, in the preparation of a fiber-forming aromatic polyester which polymerizes while releasing 1,2-glycol, adding to the polyester melt having an intrinsic viscosity [$\eta$] of at least 0.3, the intrinsic viscosity being determined from the viscosity of ortho-chlorophenol solution of the polymer measured at 35° C., (1) At least one glycol ester of a dicarboxylic acid represented by the formula

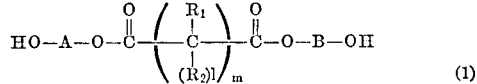
(1)

in which A and B are divalent organic radicals which may be same or different, and $m$ is 0 or 1, $l$ being one or zero when $m$ is 1; when $m=1$ and $l=1$, $R_1$ and $R_2$ may be same or different, and are selected from the group consisting of hydrogen, monovalent hydrocarbon residues of 1–12 carbons, and halogen-substituted hydrocarbon residues thereof, the total carbon number of $R_1$ and $R_2$ never exceeding 12; when $m=1$ and $l=0$, $R_1$ is selected from divalent hydrocarbon residues of 1–12 carbons and halogen-substituted hydrocarbon residue of 1–12 carbons; and when $m=0$, the compound of the above Formula 1 may be an intramolecular ester of the formula

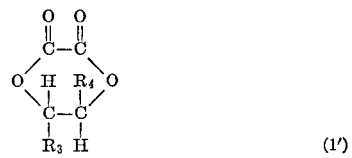
(1')

in which $R_3$ and $R_4$ are each selected from the group consisting of hydrogen, monovalent hydrocarbon residues of 1–20 carbons which may be optionally halogen-substituted, and $R_3$ and $R_4$ may be same or different, and/or (2) At least one polyester containing at least one structural unit of the formula

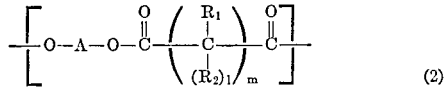
(2)

in which the definitions of A, $R_1$, $R_2$, $m$ and $l$ are the same as those given as to Formula 1, the amounts of the additives being 0.05–6 mol percent based on the total acid component forming the aromatic polyester, the amount of the polyester containing the above structural unit of Formula 2 being calculated with one of such structural unit being regarded as one molecule, and subjecting the system to the conditions that allow further progress of the polycondensation reaction of the aromatic polyester.

According to the invention, an aromatic bifunctional carboxylic acid such as terephthalic acid, diphenyl-4,4′-dicarboxylic acid, and naphthalene-2,6-dicarboxylic acid, or a lower aliphatic ester thereof and those already mentioned at the beginning of this specification by way of examples (hereinafter they are referred to as the aromatic bifunctional carboxylic acid component) is reacted with 1,2-glycol or a reactive derivative thereof, such as ethylene glycol, ethylene oxide, propylene glycol, and the like (hereinafter this reactant is referred to as the dihydroxy compound component), to first form a diglycol ester of the aromatic bifunctional carboxylic acid or a lower polycondensation product thereof, in a manner similar to the already mentioned polymerization reaction of polyethylene terephthalate. Then the product is heated at a reduced pressure in the presence of a polycondensation catalyst, to advance the polycondensation reaction while releasing 1,2-glycol, to produce the desired aromatic polyester. In this procedure, according to the invention, to the melt of the reaction product of the stage when the intrinsic viscosity of the polycondensation product reached at least 0.3, preferably at least 0.4, inter alia, at least 0.5, the glycol ester of a dicarboxylic acid represented by the Formula 1 or 1′, or a polyester containing at least one structural unit represented by the Formula 2 is added, and the mixture is further subjected to the conditions under which the polycondensation of the polyester progresses.

The above-described process is applicable not only to the preparation of homopolyesters from the aromatic bifunctional carboxylic acid component and dihydroxy compound component as above-specified, but also to the preparation of any copolyester so far as the resulting polycondensation product possesses fiber- or film-forming ability. Processes for making such copolyesters are known, wherein normally no more than approximately 20 mol percent, preferably no more than 10 mol percent, to the aforesaid aromatic bifunctional carboxylic acid component of other bifunctional acid component and/or no more than approximately 20 mol percent, preferably no more than 10 mol percent, to the aforesaid dihydroxy compound component of other dihydroxy compound or compounds, are subjected to the polycondensation reaction, together with the two main components.

As such other bifunctional acid component and dihydroxy compounds for making copolyesters, the following may be named by way of examples [bifunctional acid component useful for the preparation of copolyesters]:

(a) aromatic dibasic acids such as
isophthalic acid,
phthalic acid,
methylterephthalic acid,
chloroterephthalic acid,
naphthalene-2,7 dicarboxylic acid,
naphthalene-1,5-dicarboxylic acid,
diphenylmethanedicarboxylic acid, and
diphenylketonedicarboxylic acid;

(b) aliphatic or cycloaliphatic dibasic acids such as
succinic acid,
glutaric acid,
adipic acid,
sebacic acid,
cyclohexanedicarboxylic acid, and
decalinedicarboxylic acid (c) hydroxycarboxylic acids such as
p-hydroxybenzoic acid,
m-hydroxybenzoic acid,
p-($\gamma$-hydroxypropoxy)benzoic acid, and
$\omega$-hydroxycaproic acid;

and mixtures of the foregoing bifunctional acids.

Also as the preferred lower aliphatic esters of those dibasic acids, methyl esters, ethyl esters and mixtures thereof, of the above-named dibasic acids can be used.

[Dihydroxy compound component useful for the preparation of copolyester]:

(a) Dihydroxy compounds such as trimethylene glycol, hexamethylene glycol, decamethylene glycol, neopentylene glycol, diethylene glycol, cyclohexanedimethanol, cyclobutanediol, 2,2-bis-p-hydroxyphenylpropane, 4,4'-dihydroxydiphenyl, 4,4'-dihydroxydiphenylsulfone, 4,4'-di-β-hydroxyethoxydiphenyl, 2,2-bis-β-hydroxyethoxyphenylpropane, 4,4'-di-β-hydroxyethoxydiphenylsulfone, p-di-β-hydroxyethoxybenzene, 1-phenoxy-2,3-dioxypropane, and mixtures of the foregoing;

(b) Reactive derivatives of 1,2-glycol, such as propylene oxide, butyl glycidylether, hexyl glycidylether, phenyl glycidylether, etc., and mixtures of such reactive derivatives of 1,2-glycol.

Also the aromatic copolyesters which are the desired products of the subject process can be prepared by using mixtures of two or more of the aforesaid aromatic bifunctional carboxylic acids such as, for example, terephthalic acid, diphenyl-4,4'-dicarboxylic acid, naphthalene-2,6-dicarboxylic acid, etc., and/or mixtures of ethylene glycol or ethylene oxide with propylene glycol. In such a case, normally 80 mol percent, preferably at least 90 mol percent, of one of the aromatic bifunctional carboxylic acid components, and, for example, no more than 20 mol precent, preferably no more than 10 mol percent, of the other acid component is used. Similar mixing ratio applies to the case of using glycol mixtures or mixtures of reactive derivatives thereof. However, the copolyesters within the scope of this invention are by no means limited to the aforesaid copolymerization ratios, but the ratios outside the foregoing ranges may be employed depending on the individual acid component and/or combination thereof with individual glycol component, as long as copolyesters exhibiting fiber-forming ability can be obtained.

According to the invention, to the melt of so polycondensed aromatic polyester having an intrinsic viscosity [η] of at least 0.3, preferably at least 0.4, which serves as the base of highly polymerized polyester, at least one glycol ester of a dicarboxylic acid expressed by the foregoing Formula 1 or 1', or a polyester containing at least one of the structural units expressed by the Formula 2 is added.

The glycol ester of dicarboxylic acid represented by the Formulae 1 and 1' to be used as an additive according to this invention can be selected from glycol esters of oxalic acid and of optionally substituted malonic acid. That is, in the foregoing Formula 1, when $m$ equals zero, the formula takes the form of

  (1a)

and when $m$ equals one,

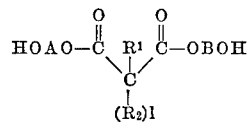  (1b)

The above Formula 1a denotes glycol esters of oxalic acid, and the Formula 1b, glycol esters of optionally substituted malonic acid. As a group of special derivatives of the glycol esters of oxalic acid represented by the Formula 1a, cyclic glycol esters of oxalic acid may be named, which are expressed by the formula:

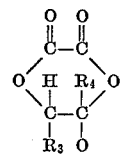  (1')

in which $R_3$ and $R_4$ may be the same or different, and selected from the group consisting of hydrogen and monovalent hydrocarbon residues of 1–20 carbons which may be optionally halogen-substituted.

Such cyclic glycol esters are also useful as the additives in accordance with the invention. Therefore, in this specification subsequent explanations are given with the understanding that the cyclic esters of Formula 1' are included in the glycol esters of dicarboxylic acids expressed by the foregoing Formula 1.

In the Formulae 1a and 1b, A and B each stand for a divalent organic radical, and they may be same or different. Preferred divalent organic radicals include, for example, the following:

(a) Divalent hydrocarbon residues of Formula 3a below;

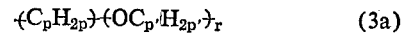  (3a)

in which $p$ and $p'$ are positive integers of 2–20, and $r$ is 0 or 1, (b) Cyclic aliphatic radicals of 6–20 carbons of Formula 3b below

  (3b)

in which $q$ is a positive integer of 6–20, (c) Optionally substituted phenylene radicals of Formula 3c below

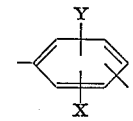  (3c)

in which X and Y are each selected from the group consisting of hydrogen, halogen, and alkyl groups of 1–4 carbons, and they may be same or different, (d) Optionally substituted divalent phenylenedihydroxyalkylene radicals of Formula 3d below

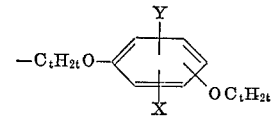  (3d)

in which X and Y have the same significations as defined above, and $t$ is a positive integer of 2–4, the total carbon number of two $C_t$'s, X, and Y never exceeding 14, (e) Optionally substituted divalent diphenylene-type aromatic radicals of Formula 3e below

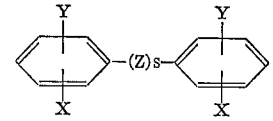  (3e)

in which X and Y have the same significations given as to Formula 3d, $s$ is 1 or 0, and Z is selected from the group consisting of oxygen, alkylidene groups of 1–4 carbons, alkylene groups of 1–4 carbons, sulfonyl radical (—SO$_2$—) and carboxyl radical (>CO), the total carbon number of X, Y, and Z never exceeding 8, and (f) Optionally substituted divalent dihydroxyalkylene radicals containing aromatic rings, which are expressed by Formula 3f below

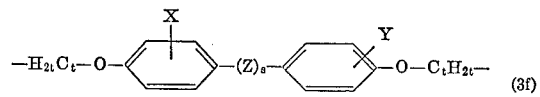  (3f)

in which X, Y, $s$, and Z have the same significations as above-defined, and $t$ is a positive integer of 2–4, the total carbon number of two $C_t$'s, X, Y, and Z never exceeding 8.

The most preferred glycol esters of the Formulas 1a are those in which both A and B are an ethylene group

Also as to the glycol esters of Formula 1b, the preferred divalent organic radicals A and B are the same as those named as to Formula 1a.

Referring to Formula 1b, $l$ is 1 or 0, and when $l$ is 0, $R_1$ stands for a divalent hydrocarbon residue of 1–12 carbons or a halogen-substituted hydrocarbon residue. Preferred atomic groups as $R_1$ when $l$ equals zero include, for example, alkylidene groups such as methylene, ethylidene, and isopropylidene; substituted alkylidene groups such as benzylidene and p-chlorobenzylidene; cycloalkylidene groups such as cyclopentylidene and cyclohexylidene; alkylene groups such as trimethylene, tetramethylene, and pentamethylene; and aromatic ring-containing alkylene groups such as ortho-xylilene.

When $l$ equals one, $R_1$ and $R_2$ are each selected from the group consisting of hydrogen, hydrocarbon residues of 1–12 carbons and halogen-substituted hydrocarbon residues, the total carbon number of $R_1$ and $R_2$ never exceeding 12. Preferred combinations of $R_1$ and $R_2$ are obtained when either of them is hydrogen, and the other is methyl, ethyl, n-propyl, iso-propyl, n-butyl, cyclohexyl, benzyl, phenyl, tolyl, naphthyl, or a halogen-substituted benzyl or halogen-substituted aryl, such as p-chlorobenzyl, chlorophenyl and bromophenyl. Incidentally, it is underable that both $R_1$ and $R_2$ are hydrogen atoms, since in that case the aromatic polyester resulting from the subject process tends to be yellowed or colored yellowish brown.

As the cyclic esters of oxalic acid represented by the Formula 1' below,

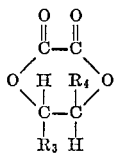  (1')

in which $R_3$ and $R_4$ are each selected from the group consisting of hydrogen, monovalent hydrocarbon residues of 1–20 carbons which are optionally halogen-substituted, and they may be same or different, the following compounds are preferred: the compounds in which both $R_3$ and $R_4$ are hydrogen atoms (ethylene oxalate), and the compounds in which either $R_3$ or $R_4$ is hydrogen, and the other is a monovalent hydrocarbon residue of 1–7 carbons such as methyl, ethyl, phenyl and benzyl, or a chlorine-substituted phenyl or benzyl, such as p-chloro-phenyl and p-chloro-benzyl. Also the compounds, in which $R_3$ and $R_4$ are methyl or ethyl and may be same or different, can be preferably used.

Specific compounds useful as the above-described additive to be used in this invention are named below, by way of examples.

(I) Examples of preferred compounds in which the A and B in Formula 1a correspond to Formula 3a:

[1] Bis-β-hydroxyethyl oxalate
[2] Bis-ω-hydroxyhexyl oxalate
[3] β-hydroxyethyl-β-hydroxypropyl oxalate
[4] β-hydroxybutyl-ω-hydroxyhexyl oxalate
[5] Bis-β-hydroxyethoxyethyl oxalate (II) Examples of preferred compounds in which the A and B in Formula 1a correspond to Formula 3b:

[6] Bis-4-hydroxycyclohexyl oxalate
[7] Bis-4-hydroxymethyl-cyclohexylmethyl oxalate
[8] 4-hydroxycyclohexyl-4-hydroxymethylcyclohexyl oxalate (III) Examples of preferred compounds in which the A and B in Formula 1a correspond to Formula 3c:

[9] Bis-4-hydroxyphenyl oxalate
[10] 4-hydroxyphenyl 3-hydroxymethyl-5-chlorophenyl oxalate (IV) Examples of preferred compounds in which the A and B in Formula 1a correspond to Formula 3d:

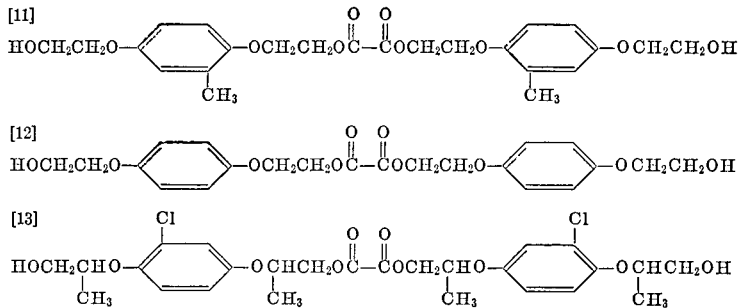

(V) Examples of preferred compounds in which the A and B in Formula 1a correspond to Formula 3e:

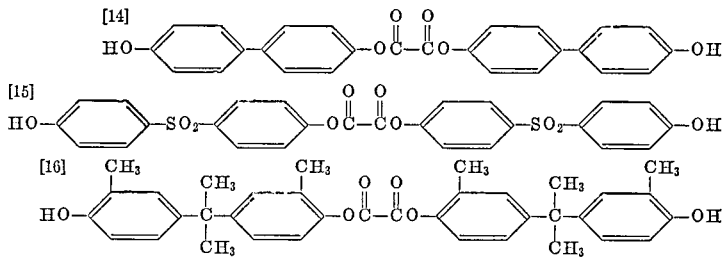

(VI) Examples of preferred compounds in which the A and B in Formula 1a correspond to Formula 3f:

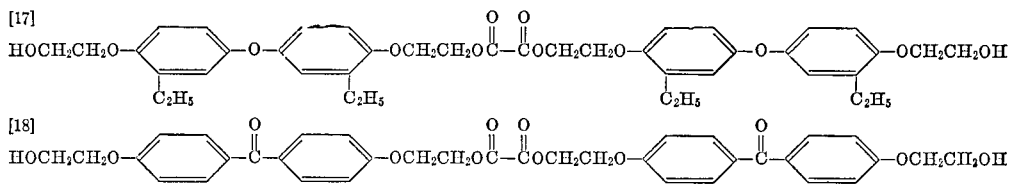

(VII) Examples of preferred compounds of Formula 1':

[19] Cyclic ethylene oxalate
[20] Cyclic propylene (1,2) oxalate
[21] Cyclic butylene (1,2) oxalate
[22] Cyclic butylene (2,3) oxalate
[23] Cyclic 1-phenyl-2-methylethylene oxalate
[24] Cyclic 1,2-diphenylethylene oxalate
[25] Cyclic 1-chlorophenylethylene oxalate (VIII) Examples of preferred compounds of Formula 1b in which $l$ is 1, both $R_1$ and $R_2$ are hydrogen atoms, and both A and B correspond to Formula 3a:

[26] Bis-β-hydroxyethyl malonate
[27] Bis-γ-hydroxypropyl malonate
[28] Bis-β-hydroxy-β-methylethyl malonate
[29] Bis-β-hydroxyethoxyethyl malonate (IX) Examples of preferred compounds of Formula 1b in which $l$ is 1, both $R_1$ and $R_2$ are hydrogen atoms, and both A and B correspond to Formula 3b:

[30] Bis-4-hydroxymethylcyclohexylmethyl malonate
[31] Bis-4-hydroxycyclohexyl malonate (X) Examples of preferred compounds of Formula 1b, in which $l$ is 1, both $R_1$ and $R_2$ are hydrogen atoms, and both A and B correspond to Formula 3c:

[32] Bis-4-hydroxyphenyl malonate
[33] Bis-4-hydroxy-2-chlorophenyl malonate (XI) Examples of preferred compounds of Formula 1b, in which $l$ is 1, both $R_1$ and $R_2$ are hydrogen atoms, and both A and B correspond to Formula 3d:

[34]
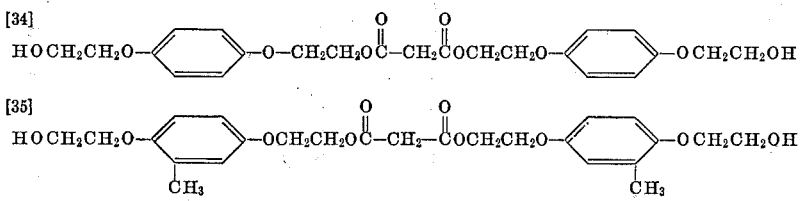

[35]
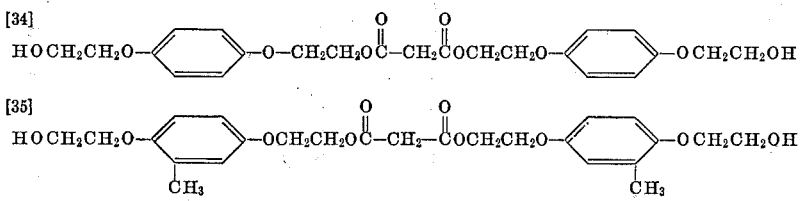

(XII) Examples of preferred compounds of Formula 1b, in which $l$ is 1, both $R_1$ and $R_2$ are hydrogen atoms, and both A and B correspond to Formula 3e:

[36]
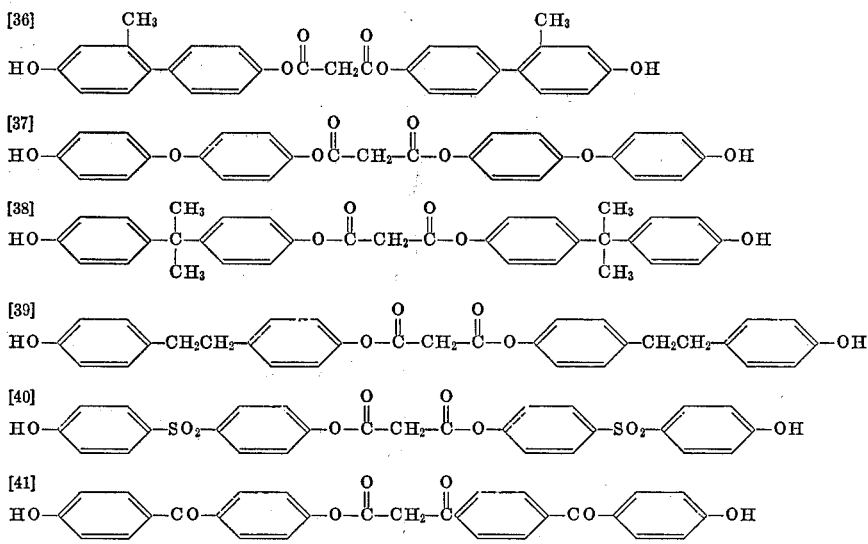

[37]

[38]

[39]

[40]

[41]

(XIII) Examples of preferred compounds of Formula 1b, in which $l$ is 1, both $R_1$ and $R_2$ are hydrogen atoms, and both A and B correspond to Formula 3f:

[42]
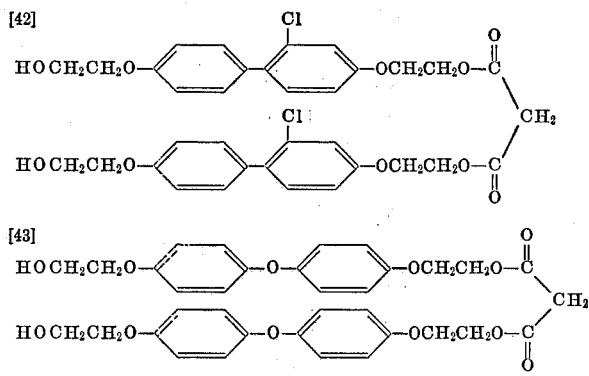

[43]

[44]
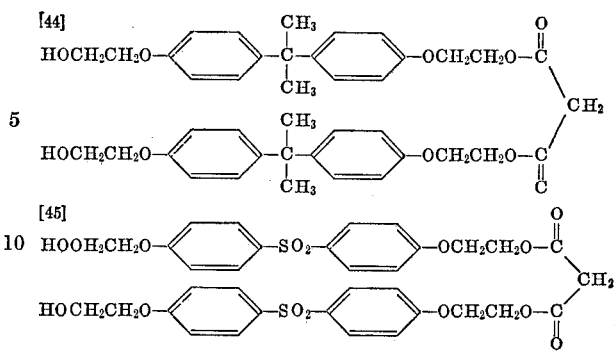

[45]

(XIV) Examples of preferred compounds of Formula 1b, in which $l$ is 1, both $R_1$ and $R_2$ are hydrogen atoms, and A and B are different:

[46] 2-Hydroxyethyl-3-hydroxypropyl malonate
[47] 2-Hydroxyethyl-4-hydroxymethyl-cyclohexylmethyl malonate

[48] 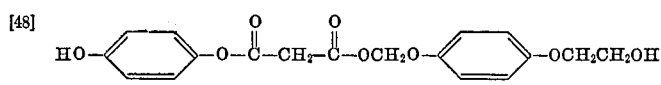

(XV) Examples of preferred compounds of Formula 1b, in which $l$ is 1, both A and B correspond to Formula 3a, $R_1$ is hydrogen, and $R_2$ is a monovalent hydrocarbon residue of 1–12 carbons, or a monovalent, halogen-substituted hydrocarbon residue of 1–12 carbons:

[49] 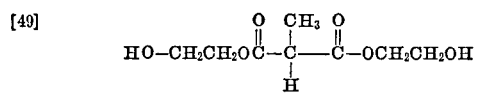

[50] 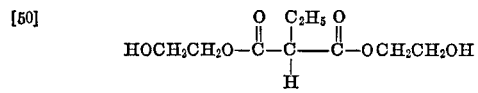

[51] 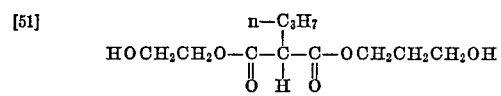

[52] 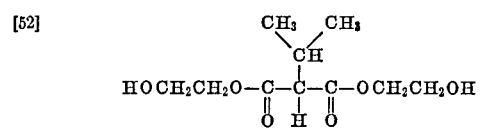

[53] 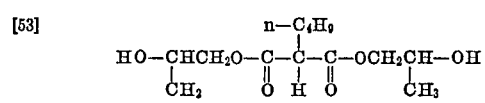

[54] 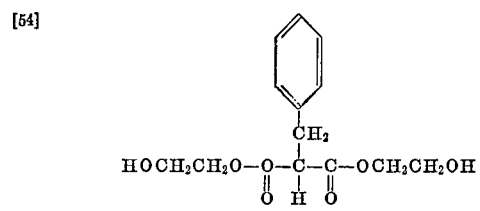

[55] 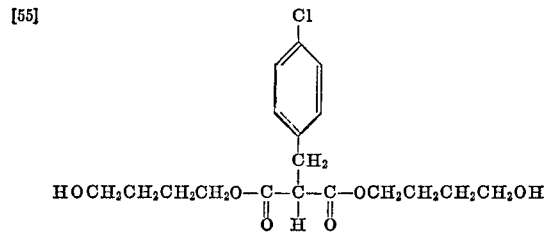

[56] 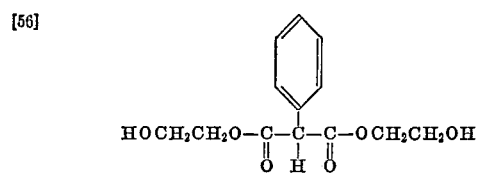

[57] 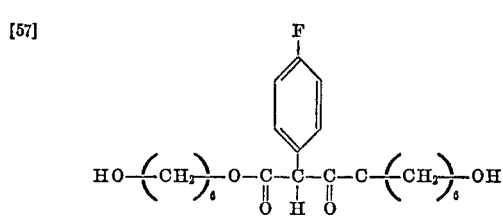

[58] 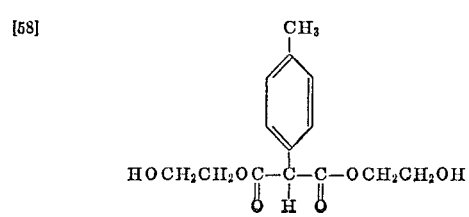

(XVI) Examples of preferred compounds of Formula 1b, in which $l$ is 1, both $R_1$ and $R_2$ are selected from monovalent hydrocarbon residues of 1–12 carbons and monovalent halogen-substituted hydrocarbon residues of 1–12 carbons:

[59] 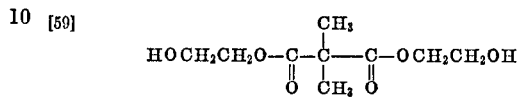

[60] 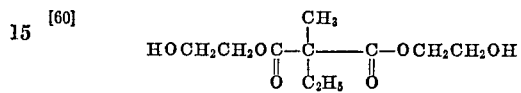

[61] 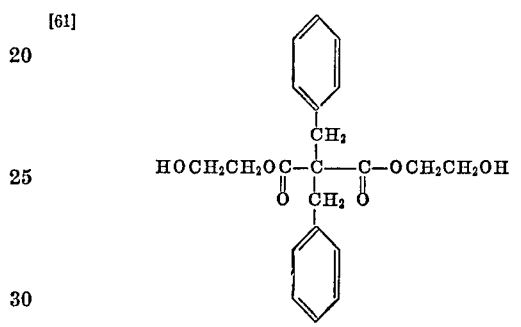

(XVII) Examples of preferred compounds of Formula 1b, in which $l$ is zero, and both A and B correspond to Formula 3a:

[62] 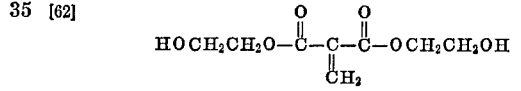

[63] 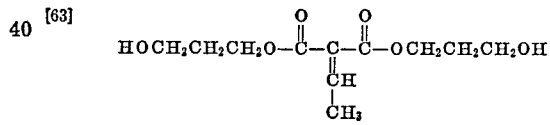

[64] 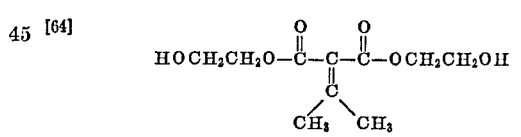

[65] 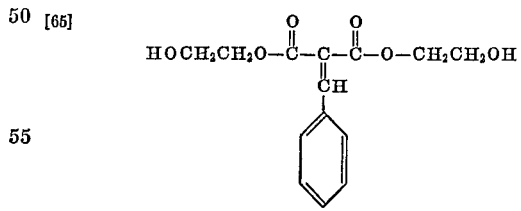

[66] 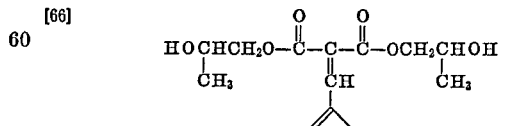

[67] 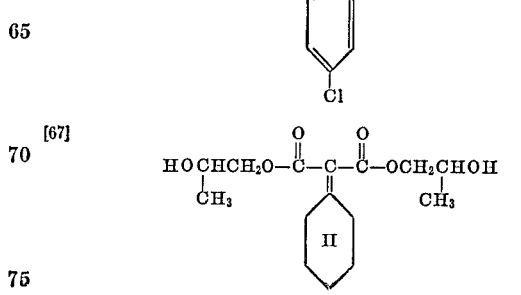

[68] 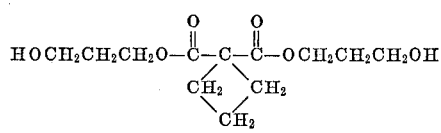

[69] 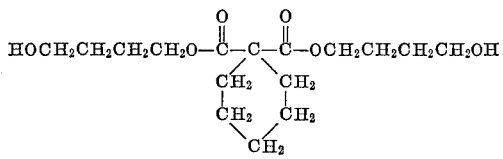

[70] 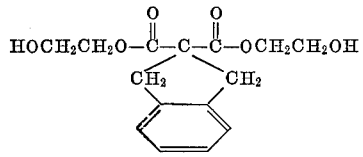

Among the foregoing compounds of groups (I) through (XVII), particularly preferred groups of compounds as the additive of the subject process are (I), (VII) and (XV).

Furthermore, as the polyester containing at least one structural unit represented by the Formula 2 below:

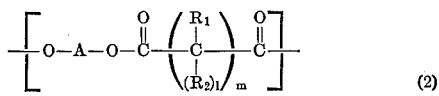
(2)

in which A is a divalent organic radical, and $m$ is 0 or 1, $l$ being 1 or 0 when $m$ is 1;

When $m=1$ and $l=1$, $R_1$ and $_2$ are each selected from the group consisting of hydrogen and monovalent hydrocarbon residues of 1–12 carbons which may be halogen-substituted, and may be the same or different, the total carbon number of $R_1$ and $_2$ never exceeding 12; and When $m=1$ and $l=0$, $R_1$ stands for a divalent hydrocarbon residue of 1–12 carbons or a halogen-substituted hydrocarbon residue of 1–12 carbons, which is also used as the additive to the melt of the aromatic polyester serving as the base, particularly the following are preferred.

(a) Polyester obtained by polycondensation of oxalic acid or optionally substituted malonic acid as the acid component and ethylene glycol as the glycol component, which is expressed by the formula below

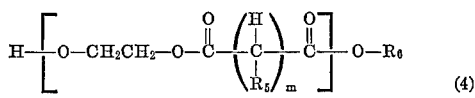
(4)

in which $R_5$ is selected from the group consisting of hydrogen, alkyl group of 1–7 carbons and benzyl, $R_6$ is hydrogen or β-hydroxyethyl, $m$ is 0 or 1, and $n$ is a positive interfer of 2–300, preferably 2–200;

(b) Copolyester of which at least 20 mol percent, particularly at least 40 mol percent, of entire structural units are formed of that expressed by the Formula 2, particularly that of Formula 4 above:

(b′) Copolyester having a degree of polymerization ranging from 2–300, particularly 2–200, of which at least 20 mol percent, more preferably at least 40 mol percent, of the entire structural units are formed of that expressed by the Formula 2, particularly that of Formula 4, and the rest is formed of ethylene terephthalate units of the formula

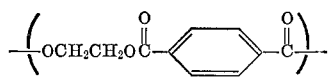

and (b″) copolyester having a degree of polymerization ranging from 2–300, particularly 2–200, of which at least 20 mol percent, more preferably at least 40 mol percent, of the entire structural units are formed of that expressed by the Formula 2, particularly that of Formula 4, and the rest is formed of ethylene naphthalene-2,6-dicarboxylate units of the formula

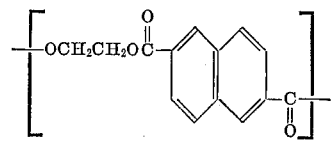

In the present invention, it is preferred to use the additive containing the same glycol component with that of the aromatic polyester. When the copolyester of (b) above is used as the additive, it is preferred to select such a compound in which the structural unit other than that expressed by Formula 2 is formed of same acid and glycol components to those composing the base aromatic polyester. With such selective use of the additive, lowering of crystallinity, and melting point of the highly polymerized aromatic polyester finally obtained from the subject process can be prevented.

The polyesters containing at least one structural unit expressed by the foregoing Formula 2 which are used as additives in the invention contain oxalic acid or malonic acid (or its substitution products) as an acid component.

If $m$ is 0 in Formula 2, Formula 2 can be rewritten as

(2a)

If $m$ is 1, Formula 2 is

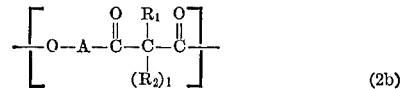
(2b)

In the Formulae 2a and 2b, A represents the same divalent organic group as shown with respect to the Formula 1a and 1b. In Formula 2b, $l$ is 1 or 0, and $R_1$ and $R_2$ represent the same atomic groups as described with respect to the Formula 1b. The preferable groups represented by A, $R_1$ and $R_2$ in Formulae 2a and 2b are also preferable groups in Formulae 1a and 1b.

The polyesters having at least one structural unit expressed by the Formula 2a or 2b include both homopolyesters and copolyesters. The following homopolyesters can be cited as examples of the additives usable in the present invention.

Examples of suitable homopolyesters expressed by Formula 2a in which A corresponds to Formula 3a:

[73] Polyethylene oxalate
[72] Polypropylene oxalate
[73] Polytetramethylene oxalate
[74] Polyhexamethylene oxalate
[75]

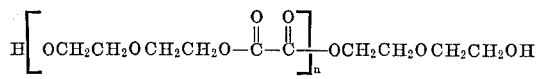

($n$ is $\geq 2$)

Examples of suitable homopolyseters expressed by Formula 2a in which A corresponds to Formula 3b:

[76] Poly-1,4-cyclohexylenedimethylene oxalate
[77] Poly-1,4-cyclohexylene oxalate Examples of suitable homopolyesters expressed by Formula 2a in which A corresponds to Formula 3c:

[78] Poly-1,4-phenylene oxalate
[79] Poly-1,3-phenylene oxalate

Examples of suitable homopolyesters expressed by Formula 2a in which A corresponds to Formula 3d:

[80]
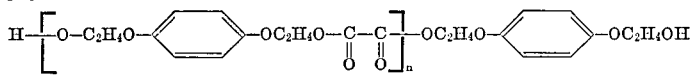

[81]
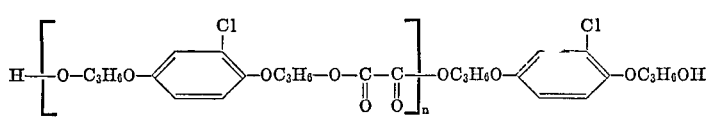

($n$ is $\geq 2$)

Examples of suitable homopolyesters expressed by Formula 2a in which A corresponds to Formula 3e:

[82]
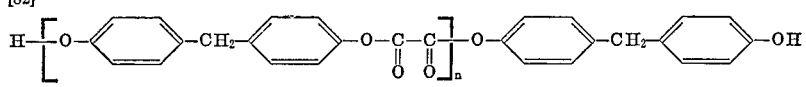

[83]
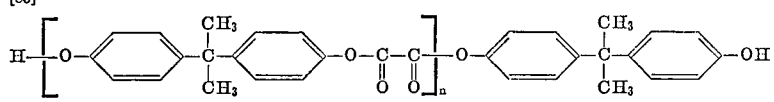

($n$ is $\geq 2$)

Examples of suitable homopolyesters expressed by Formula 2a in which A corresponds to Formula 3f:

[84]
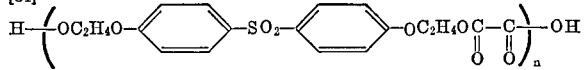

[85]
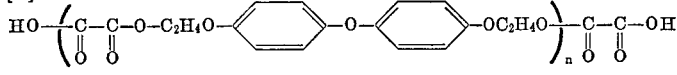

($n$ is $\geq 2$)

Examples of suitable homopolyesters expressed by Formula 2b in which $l$ is 1 and A corresponds to Formula 3a:

[86] Polyethylene malonate
[87] Polypropylene malonate
[88] Polyhexamethylene malonate
[89] Polyethylenemethyl malonate
[90] Polyethylenebenzyl malonate
[91] Polytetramethylenedimethyl malonate Examples of suitable homopolyesters expressed by Formula 2b in which $l$ is 1 and A corresponds to Formula 3b:

[92] Poly-1,4-cyclohexylenedimethylene malonate
[93] Poly-1,4-cyclohexyleneethyl malonate Examples of suitable homopolyesters expressed by Formula 2b in which $l$ is 1 and A corresponds to Formula 3c:

[94] Poly-1,4-phenylene malonate
[95] Poly-1,4-phenylenepropyl malonate
[96] Poly-1,4-phenylenebenzyl malonate Examples of suitable homopolyesters expressed by Formula 2b in which $l$ is 1 and A corresponds to Formula 3d:

[97]
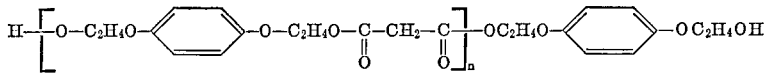

[98]
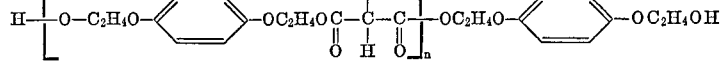

($n$ is $\geq 2$)

Examples of suitable homopolyesters expressed by Formula 2b in which $l$ is 1 and A corresponds to Formula 3e:

[99]
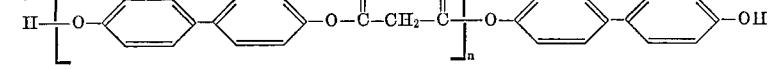

[100]
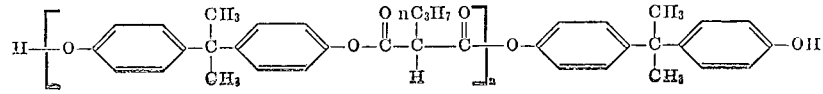

($n$ is $\geq 2$)

Examples of suitable homopolyesters expressed by Formula 2b in which $l$ is 1 and A corresponds to Formula 3f:

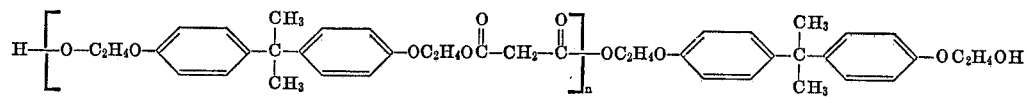
[101]

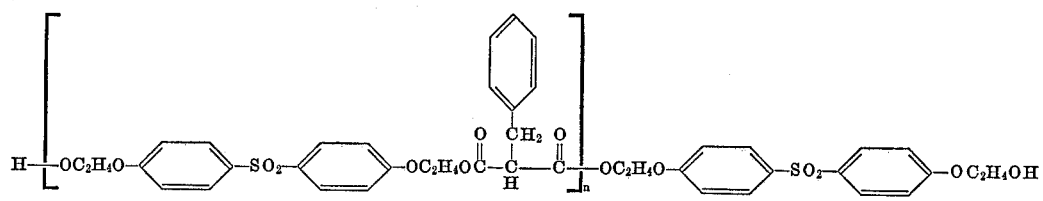
[102]

Examples of suitable homopolyesters expressed by Formula 2b in which $l$ is 0 and A corresponds to Formula 3a:

[103] 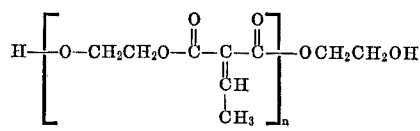

[104] 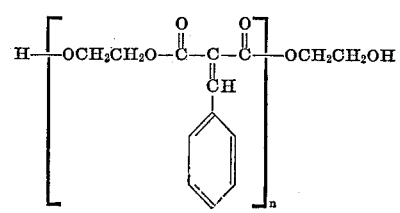

[105] 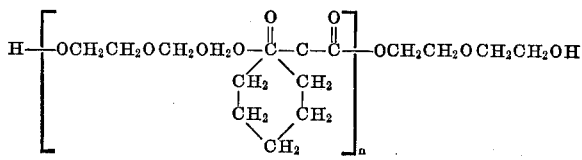

($n$ is $\geq 2$)

Examples of suitable homopolyesters expressed by Formula 2b in which $l$ is 0 and A corresponds to Formula 3b:

[106] 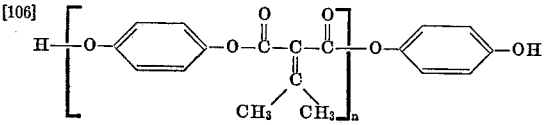

[107] 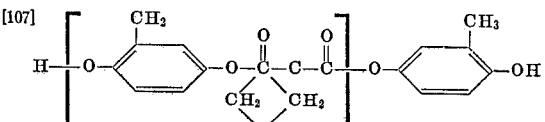

($n$ is $\geq 2$)

Examples of suitable homopolyesters expressed by Formula 2b in which $l$ is 0 and A corresponds to Formula 3c:

[108] 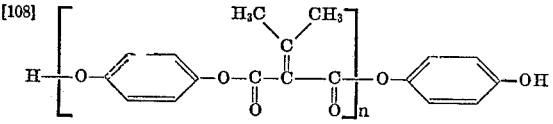

[109] 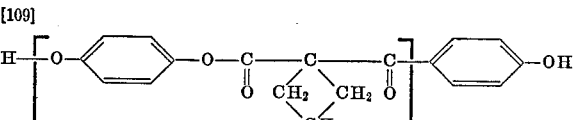

($n$ is $\geq 2$)

Examples of suitable homopolyesters expressed by Formula 2b in which $l$ is 0 and A corresponds to Formula 3d:

[110] 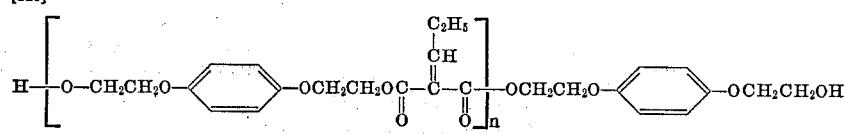

[111] 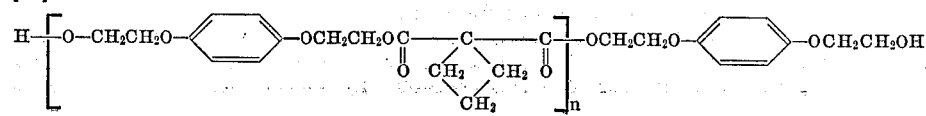

($n$ is $\geq 2$)

Examples of suitable homopolyesters expressed by Formula 2b in which $l$ is 0 and A corresponds to Formula 3e:

[112]
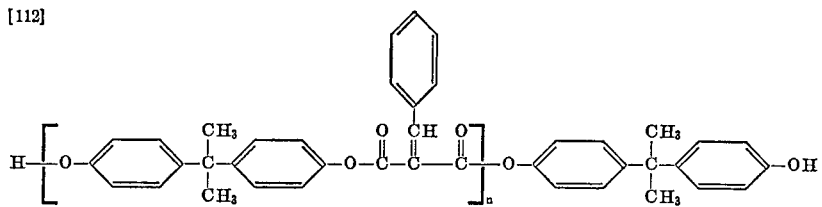

[113]
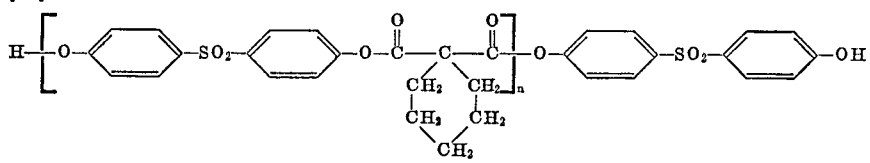

($n$ is $\geq 2$)

Examples of suitable homopolyesters expressed by Formula 2b in which $l$ is 0 and A corresponds to Formula 3f:

[114]
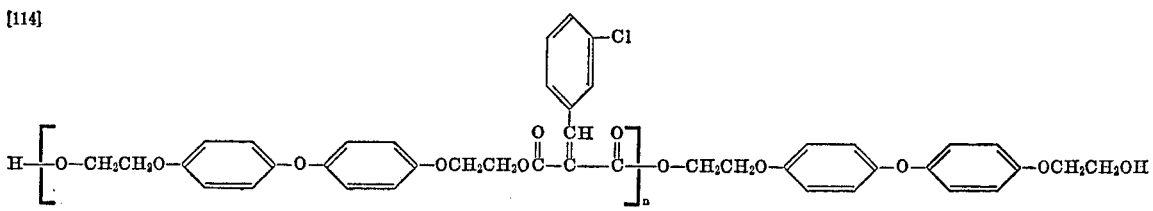

[115]
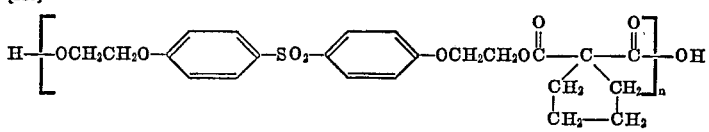

($n$ is $\geq 2$)

The copolyesters containing at least one structural unit expressed by the Formula 2a or 2b which are usable as additives in the present invention may be any copolyesters composed of the above-mentioned homopolyesters containing oxalic acid or malonic acid (or its substitution products) as a dicarboxylic acid component and known bifunctional acids and/or dihydroxyl compounds. As preferable copolymerizable components, the bifunctional acids illustrated above and the dihydroxyl compounds illustrated above can be cited.

It is confirmed in the course of research that, when, for example, the β-hydroxyethylmethyl ester of oxalic acid of the formula

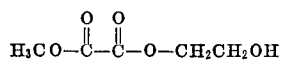

is added to the molten aromatic polyester in a manner similar to the additives within the scope of this invention and subjected to the conditions as will allow further progress of the polycondensation reaction, it is possible to reduce the free carboxyl group content of the product aromatic polyester, but the rate of polymerization is markedly reduced. Furthermore, when such a compound is added in larger amounts, the degree of polymerization of the aromatic polyester also is lowered. Similar objectionable effects were observed when the following compounds were added:

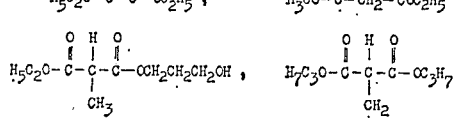

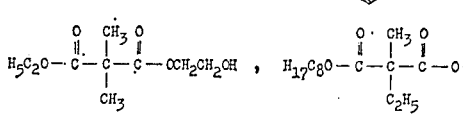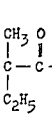

Also according to research, it is confirmed that similar addition of such compounds as the mono-β-hydroxyethyl ester of oxalic acid of the formula

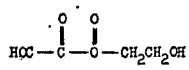

or mono-ethyl ester of oxalic acid, mono-β-hydroxyethyl ester of malonic acid, or mono-ethyl ester of benzyl malonic acid, to the molten aromatic polyester, is ineffective for reducing the free carboxyl group content of the finally obtained aromatic polyester.

Therefore, it is indeed surprising that the above-specified additives of this invention only can reduce the free carboxyl group content of the aromatic polyesters, while in no way adversely affecting the rate of polymerization, as stated in full details hereinbelow.

The additive employed in the present invention can be either of the glycol ester dicarboxylic acid represented by the above-given Formula 1a, 1b, or 1' (oxalic acid or optionally substituted malonic acid) and homo- or co-polyester containing at least one structural unit of the Formula 2, inter alia, that of the Formula 4. According to the invention, the additive is added to the melt of a base aromatic polyester having an intrinsic viscosity $[\eta]$ of at least 0.3, preferably at least 0.4, at such a ratio of 0.05–6 mol percent, preferably 0.07–3 mol percent, based on the total acid component of the polyester melt. Note, however, that when the homo- or co-polyester containing at least one of the structural unit of Formula 2, preferably of Formula 4, is used as the additive, the amount thereof is calculated, regarding one structural unit in the homo- or co-polyester as one molecule. The additive can reduce the free carboxyl group content of the finally obtained fiber-forming aromatic polyester to quite satisfactory degree, when added in a normally very minor amount such as in the order of 0.07–2 mol percent, as calculated by the above-described method.

According to the invention, the additive is added to the base aromatic polyester melt having an intrinsic viscosity of at least 0.3, preferably at least 0.4, and the resulting melt containing the additive is placed under such conditions that will allow further progress of polycondensation reaction of the aromatic polyester. Whereupon the polycondensation reaction can advance at the same or substantially same polymerization rate compared with that of conventional polycondensations of polyesters in the absence of such additive, and the desired polyester has a satisfactorily reduced free carboxyl group content. The conditions that will allow further progress of the polycondensation reaction of the polyester melt containing the additive (mixture) can be applied in two ways, i.e. either.

(i) The melt containing the additive is heated to approximately 200–350° C., preferably 260–320° C., at a reduced pressure of, for example, not higher than 2 mm. Hg, or more preferably in high vacuum of 1 mm. Hg or less, or in an inert gaseous current, or (ii) The melt containing additive is first cooled as in conventional solid phase polymerization, and formed into chips or powder, followed by heating at a temperature lower than the melting point of the chips or powder by 10–60° C., preferably by 20–50° C., in the above-described high degree of vacuum or inert gaseous current.

When the additive specified in this invention is added to the melt of base aromatic polyester having an intrinsic viscosity of at least 0.3, preferably at least 0.4, the additive quickly reacts with the molten polyester to reduce free carboxyl groups in the polyester, while releasing carbon dioxide gas. Thus, the carbon dioxide discharge is accelerated by placing the polyester melt-additive mixture under either of the conditions (i) and (ii). When the glycol ester of the Formula 1a or 1', or a polyester containing the structural unit of Formula 2 or 4 in which $m$ equals zero, is used as the additive, upon reaction of such an additive with the molten polyester, one or more side products such as formic acid, 1,2-glycol ester of formic acid, and 1,2-glycol ester of excessive oxalic acid, are formed. If a glycol ester of Formula 1b or a polyester containing structural unit of Formula 2 or 4 in which $m$ equals one, is used as the additive, the reaction of the additive with the molten polyester produces acetic acid, substituted acetic acid, and/or 1,2-glycol esters of the foregoing as side products. Most or part of such side product is also driven off from the reaction system, together with the carbon dioxide gas.

The reason why the additive of the invention is added to the molten aromatic polyester having an intrinsic viscosity of at least 0.3, preferably at least 0.4, is because, when the intrinsic viscosity is below the specified limit, the additive is decomposed and escapes from the system, and the objects of this invention cannot be achieved.

The polyester melt added with the additive is subjected to the polycondensation reaction conditions of (i) or (ii), for a time varying due to such factors as the intrinsic viscosity $[\eta]$ of the polyester melt before addition of the additive, type of the additive, intrinsic viscosity $[\eta]$ corresponding to the desired polymerization degree of finally obtained aromatic polyester, and the free carboxyl group content desired for the finally obtained aromatic polyester, etc. Normally, however, the time is variable over a range of several minutes to several tens of hours. When the intrinsic viscosity of the molten polyester is at least 0.3, preferably at least 0.4, at the addition time of the additive, normally there is no critical upper limit in the intrinsic viscosity, as long as the aromatic polyester is meltable at temperatures not higher than 350° C., preferably not higher than 320° C. In most cases the additive is added to the melt of an aromatic polyester having an intrinsic viscosity of at least 0.3, preferably at least 0.4, inter alia, at least 0.5, and not higher than 1, preferably not higher than 0.95.

The higher the intrinsic viscosity of the aromatic polyester melt before addition of the additive, and the lower the intrinsic viscosity of the desired aromatic polyester, the shorter may be the polycondensation time under the above-given conditions (i) or (ii), and vice versa. Also generally the polycondensation under condition (i) requires less time than that under condition (ii).

When the molten aromatic polyester containing the additive is subjected to the polycondensation conditions (i) or (ii) in accordance with the invention, the additive and aromatic polyester react to temporarily form a copolymer, as already mentioned. When exposed to the polycondensation conditions for a sufficiently long time, the acid component in the copolymerized additive is released as it is or in decomposed form, and eliminated from the reaction system in the form of the aforementioned side products. If more than 0.5 mol percent, particularly more than 1 mol percent of the additive remains in the finally obtained aromatic polyester in the copolymerized form, the improvement in resistance to wet heat of the product is inhibited to some degree, although the free carboxyl group content of the aromatic polyester is reduced. Therefore, it is desirable in this invention to control the copolymerization ratio of oxalic or optionally substituted malonic acid component of the additive in the finally obtained aromatic polyester, so that it should not exceed 1 mol percent, preferably 0.5 mol percent, to the total acid component of the aromatic polyester. Such control can be effected by suitably selecting the amount of additive, time of addition, viz intrinsic viscosity of the polyester melt, duration of polycondensation conditions (i) or (ii), and temperature condition thereof. For example, the oxalic acid or optionally substituted malonic acid component in the copolymerized additive in the finally obtained aromatic polyester decreases with less addition of the additive, lower intrinsic viscosity of the polyester melt although not lower than 0.3, higher polycondensation temperature, and longer polycondensation treatment. However, when such conditions are made excessively severe, the free carboxyl group content of the finally produced aromatic polyester cannot be sufficiently lowered.

The process of this invention is particularly useful for the preparation of fiber-forming aromatic polyesters having an intrinsic viscosity of not less than 0.8. Attempts to prepare fiber-forming aromatic polyesters of such high intrinsic viscosity by conventional processes inevitably require high temperature heating for a prolonged period to achieve sufficiently high degree of polymerization, and the resulting increase in intrinsic viscosity is always accompanied with the increase in free carboxyl group content, however, it is possible according to this invention, to prepare aromatic polyesters having high intrinsic viscosities and low free carboxyl group contents. Thus, in accordance with the invention, fiber-forming aromatic polyesters having intrinsic viscosities not less than 0.8 and free carboxyl group contents not exceeding 20 equivalents/$10^6$ g. of the polymer can be very easily prepared. The fiber prepared by spinning and drawing such aromatic polyester exhibits high tenacity, Young's modulus and fatigue resistance, and furthermore excellent resistance to wet heat, as already mentioned. Obviously such fiber is extremely useful, particularly as tire cord.

Under the polycondensation conditions (i) or (ii) employed in the invention, any known catalyst the polycondensation polyesters may be concurrently present. Particularly effective catalysts include, for example, antimony trioxide, germanium oxide, zinc acetate, manganese acetate, titanium tetrabutoxide, cerium acetate etc. It is also permissible to add a phosphorus-containing compound such as phosphoric acid, phosphorous acid, phosphonic acids, and esters thereof, to the polycondensation system, as the stabilizer of the resulting aromatic polyester. Furthermore, pigments such as titanium oxide can also be added if necessary.

The subject process is particularly advantageous when it is practiced with commercial scale equipment, and is particularly useful when applied to continuous polymerization and spinning of highly polymerized polyethylene terephthalate.

Hereinafter the invention will be explained with reference to working examples, in which parts are by weight. The measurement of free carboxyl group content was effected, following the method of A. Conix (Makromol. Chem. 26, 226 (1958)).

EXAMPLES 1-6 AND CONTROLS 1-6

Instance are shown in which the time of addition of the additive has been varied.

97 parts of dimethyl terephthalate, 69 parts of ethylene glycol, 0.04 part of antimony trioxide and 0.088 part of calcium acetate were charged to a fractionating column-equipped reactor and heated, the methanol formed being distilled off externally of the system. After the methanol was completely distilled off, the excess glycol started distilling off; this also was eliminated. After the internal temperature reached 230° C., the reaction product (precondensation reaction product) was transferred to another reactor. Next, 0.08 part of 50% aqueous phosphorous acid solution was added and the internal temperature was gradually raised to 260° C. in about 30 minutes, the reaction being carried out at a reduced pressure of 20 mm. Hg with stirring. Next, the internal temperature was rapidly raised to 283° C. where the reaction was carried out for the prescribed period of time under a high vacuum of 0.1–1 mm. Hg with stirring, after which the pressure was returned to normal atmospheric pressure with nitrogen and one of the various additives was added at once to the reaction system in the amount prescribed, following which the reaction was continued with stirring at 283° C. and a high vacuum of 0.1–1 mm. Hg until the intrinsic viscosity of the polyethylene terephthalate became 0.75 or more.

The class and amount of the additive added during the course of the reaction and the intrinsic viscosity of the polyethylene terephthalate at the time of addition of the additive as well as the intrinsic viscosity of the polyethylene terephthalate and free carboxyl group content of the polyethylene terephthalate after completion of the overall reaction are shown in Tables I and II.

TABLE I.—TIME OF ADDITION OF OXALATES

| Experiment No. | Additive [1] | | Amount added of additive [2] | High vacuum [3] | Intrinsic viscosity of polyethylene terephthalate [4] | High vacuum [5] | Intrinsic viscosity of resulting polyethylene terephthalate [6] | Softening point [7] | Free carboxyl group [8] |
|---|---|---|---|---|---|---|---|---|---|
| Control 1 | [1] | | 2.67 (3.0) | 30 | 0.215 | 120 | 0.778 | 261.8 | 33.5 |
| Control 2 | [1] | | 0.89 (1.0) | 30 | 0.220 | 120 | 0.795 | 261.8 | 31.5 |
| Example: | | | | | | | | | |
| 1 | [1] | | 0.89 (1.0) | 40 | 0.303 | 105 | 0.786 | 261.9 | 21.0 |
| 2 | [1] | | 0.89 (1.0) | 50 | 0.443 | 95 | 0.795 | 261.9 | 13.5 |
| 3 | [1] | | 0.45 (0.5) | 60 | 0.542 | 80 | 0.803 | 261.9 | 14.0 |
| Control 3 | [71] | $n=3$ | 0.68 (1.0) | 30 | 0.221 | 120 | 0.780 | 262.0 | 31.0 |
| Example: | | | | | | | | | |
| 4 | [71] | $n=3$ | 0.68 (1.0) | 40 | 0.312 | 80 | 0.802 | 261.9 | 14.5 |
| 5 | [71] | $n=3$ | 0.68 (1.0) | 60 | 0.551 | 60 | 0.814 | 261.8 | 9.5 |
| 6 | [71] | $n=3$ | 0.68 (1.0) | 75 | 0.614 | 55 | 0.800 | 261.9 | 11.9 |
| 7 | [71] | $n=3$ | 0.68 (1.0) | 90 | 0.709 | 50 | 0.811 | 261.9 | 11.5 |
| 8 | [71] | $n=3$ | 0.68 (1.0) | 120 | 0.750 | 30 | 0.825 | 261.8 | 10.5 |
| 9 | [71] | $n=3$ | 0.68 (1.0) | 140 | 0.792 | 30 | 0.815 | 261.7 | 12.2 |

[1] The reference numerals used above are the numbers indicating previously given compounds, which likewise apply in the case of the subsequent examples, the character $n$ indicating the degree of polymerization.
[2] Part and (mol percent based on terephthalic acid component).
[3] Reaction time before addition of additive (minutes).
[4] At time of addition of additive.
[5] Reaction time after addition of additive (minutes).
[6] High degree of polymerization.
[7] Resulting polyethylene terephthalate of high degree of polymerization (° C.).
[8] Content of resulting polyethylene terephthalate of high degree of polymerization.

TABLE II.—TIME OF ADDITION OF CYCLIC COMPOUNDS AND MALONATES

| Experiment No. | Additive [1] | | Amount added of additive [2] | High vacuum [3] | Intrinsic viscosity of polyethylene terephthalate [4] | High vacuum [5] | Intrinsic viscosity of resulting polyethylene terephthalate [6] | Softening point [7] | Free carboxyl group [8] |
|---|---|---|---|---|---|---|---|---|---|
| Control 4 | [19] | | 1.16 (2.0) | 25 | 0.201 | 130 | 0.788 | 262.0 | 32.1 |
| Example: | | | | | | | | | |
| 10 | [19] | | 1.16 (2.0) | 65 | 0.563 | 75 | 0.803 | 261.9 | 15.2 |
| 11 | [20] | | 1.30 (2.0) | 110 | 0.733 | 30 | 0.830 | 261.9 | 11.8 |
| Control 5 | [26] | | 0.96 (1.0) | 30 | 0.244 | 120 | 0.780 | 262.0 | 31.8 |
| Example: | | | | | | | | | |
| 12 | [26] | | 0.96 (1.0) | 45 | 0.444 | 100 | 0.790 | 261.8 | 15.5 |
| 13 | [26] | | 0.48 (0.5) | 80 | 0.650 | 80 | 0.801 | 261.9 | 16.5 |
| Control 6 | [89] | $n=5$ | 0.78 (1.0) | 25 | 0.231 | 120 | 0.792 | 262.0 | 32.8 |
| Example: | | | | | | | | | |
| 14 | [89] | $n=5$ | 0.78 (1.0) | 45 | 0.428 | 95 | 0.815 | 262.0 | 14.5 |
| 15 | [89] | $n=5$ | 0.78 (1.0) | 60 | 0.601 | 80 | 0.818 | 261.8 | 10.2 |
| 16 | [89] | $n=5$ | 0.78 (1.0) | 110 | 0.750 | 30 | 0.825 | 261.7 | 12.5 |
| 17 | [89] | $n=5$ | 0.78 (1.0) | 140 | 0.800 | 30 | 0.815 | 261.9 | 15.5 |

[1]–[8] See footnotes at bottom of Table I.

It is apparent from the results shown in the foregoing tables that the free carboxyl group content of the resulting polyethylene terephthalate of high degree of polymerization cannot be reduced to a sufficient degree when the time of addition of the additive is too early.

Further, when additives [1] and [71] or [26] and [89] are compared, it can be seen that the polymerization time can be shortened by using additives whose degree of polymerization is higher. On the other hand, when comparisons are made between the time of addition and the polymerization time, it can be seen that the tendency is to a prolonging of the polymerization time as the time of addition is retarded.

The bis-beta-hydroxyethyl oxalate (additive [1] used in Example 1, above, was obtained in the following manner. A mixture consisting of 73 parts of diethyl oxalate and 69 parts of ethylene glycol to which had been added 0.088 part of calcium acetate monohydrate as catalyst was submitted to the ester-interchange reaction. The reaction was concluded after about 150 minutes when 56 ml. of ethanol had distilled off. The reaction mixture was introduced into water, and the white crystals formed were separated, dried and thereafter submitted to solid distillation under high vacuum to obtain the intended bis-beta-hydroxyethyl oxalate whose boiling point at 0.07 mm. Hg was 128° C. The polyethylene oxalate used in Examples 4–9 (additive [71]) was obtained as follows: 146 parts of diethyl oxalate and 138 parts of ethylene glycol were mixed and to this mixture was added 0.176 part of calcium acetate monohydrate. After about 230 minutes had elapsed, since the temperature of the reaction solution reached the point of 140° C., ethanol in about its theoretical quantity had distilled off and the reaction was completed at this point. The resulting mixture was then transferred to another vessel and, after adding 0.180 part of titanium tetrabutoxide, the polymerization reaction was carried out at 200° C. first for 20 minutes at 20 mm. Hg and then for 120 minutes under a high vacuum of 10–5.0 mm. Hg to obtain the intended polyethylene oxalate. When the molecular weight of the white crystals obtained was obtained from the measurement of the terminal group concentration, the average degree of polymerization was about 3.

The cyclic ethylene oxalate (additive [19]) used in Example 10 was obtained in the following manner. 146 parts of diethyl oxalate and 62 parts of ethylene glycol were mixed and 0.176 part of calcium acetate monohydrate was added to the mixture. Since ethanol started to gradually distill off about the time when the reaction solution temperature had risen to 130° C., it was continuously distilled off externally of the system. After about 160 minutes and the distillation of the ethanol had been completed and the reaction temperature had risen to 192° C. a light yellow coloration of the mixture was noted. The reaction was terminated at this point. After cooling the reaction solution to 40° C., it was poured into a (1:1) acetone-water mixture, and the white crystals formed were recrystallized from acetone to obtain the intended cyclic ethylene oxalate in an amount of about 82 parts, which were white crystals having a melting point of 142° C.

The bis-beta-hydroxyethyl malonate (additive [26]) used in Examples 12 and 13 were synthesized by the ester-interchange method using calcium acetate, as in the case of the synthesis of the hereinbefore described bis-beta-hydroxyethyl (additive [1]).

EXAMPLES 18–30 AND CONTROLS 7–12

Instances are shown in which the amount of additive added has been varied.

92.1 parts of dimethyl terephthalate, 4.9 parts of dimethyl isophthalate, 6.9 parts of ethylene glycol, 0.04 part of antimony trioxide and 0.07 part of manganese acetate were charged to a fractionating column-equipped reactor and heated, the methanol forming being distilled off externally of the system. After the distillation of the methanol completely ended, the distillation of the excess glycol began; this also was eliminated externally of the system. After the internal temperature reached 230° C., the reaction product (precondensation reaction product) was transferred to another reactor. Next, after adding 0.08 part of 50% aqueous phosphorus acid solution, the internal temperature was gradually raised to 260° C. over a period of about 30 minutes and the reaction was carried out under a reduced pressure of 20 mm. Hg with stirring, following which the internal temperature was rapidly raised to 280° C. and the reaction was continued for another 60 minutes under a vacuum of 0.1–1 mm. Hg with stirring. Next, the pressure was returned to normal atmospheric pressure with the use of nitrogen and one of the various additives was added at a time to the reaction system in the amount prescribed. The pressure was decreased to 0.1 mm. Hg–1 mm. Hg in 20 minutes, and the reaction was continued at this pressure and at a temperature of 280° C. for 80 minutes with stirring.

The amount of additive added and the intrinsic viscosity of the polyethylene terephthalate at the time of addition of the additive as well as the intrinsic viscosity of the polyethylene terephthalate after completion of the overall reaction are shown in Tables III and IV.

TABLE III.—VARIATIONS IN AMOUNT ADDED

| Experiment No. | Additive [1] | Amount added of additive [2] | High vacuum [3] | Intrinsic viscosity of polyethylene terephthalate [4] | High vacuum [5] | Intrinsic viscosity of resulting polyethylene terephthalate [6] | Softening point [7] | Free carboxyl group [8] |
|---|---|---|---|---|---|---|---|---|
| Control: 7 [9] | | | 140 | 0.839 | | | 249.8 | 32.8 |
| Control 8 | [71] n=2 | 0.02 (0.03) | 60 | 0.563 | 80 | 0.829 | 249.8 | 30.5 |
| Example: | | | | | | | | |
| 18 | [71] n=2 | 0.04 (0.06) | 60 | 0.558 | 80 | 0.832 | 249.7 | 20.3 |
| 19 | [71] n=2 | 0.07 (0.10) | 60 | 0.560 | 80 | 0.817 | 249.9 | 18.9 |
| 20 | [71] n=2 | 0.19 (0.25) | 60 | 0.559 | 80 | 0.833 | 249.9 | 16.0 |
| 21 | [71] n=2 | 0.37 (0.50) | 60 | 0.553 | 80 | 0.844 | 250.0 | 11.6 |
| 22 | [71] n=2 | 0.55 (0.75) | 60 | 0.559 | 80 | 0.826 | 250.0 | 10.2 |
| 23 | [71] n=2 | 1.10 (1.50) | 60 | 0.583 | 80 | 0.832 | 249.8 | 9.5 |
| 24 | [71] n=2 | 2.20 (3.0) | 60 | 0.569 | 80 | 0.825 | 249.5 | 7.2 |
| Control: | | | | | | | | |
| 9 | [71] n=2 | 5.88 (8.0) | 60 | 0.553 | 80 | 0.801 | 248.3 | 7.3 |
| 10 | [19] | 0.02 (0.03) | 60 | 0.555 | 80 | 0.822 | 250.0 | 31.5 |
| Example 25 | [19] | 0.58 (1.0) | 60 | 0.549 | 80 | 0.813 | 249.9 | 11.7 |
| Control 11 | [103] n=5 | 0.02 (0.03) | 60 | 0.552 | 80 | 0.815 | 250.0 | 33.8 |
| Example: | | | | | | | | |
| 26 | [103] n=5 | 0.08 (0.10) | 60 | 0.562 | 80 | 0.805 | 249.9 | 19.5 |
| 27 | [103] n=5 | 0.42 (0.50) | 60 | 0.572 | 80 | 0.812 | 249.9 | 15.5 |
| 28 | [103] n=5 | 0.84 (1.00) | 60 | 0.564 | 80 | 0.825 | 250.0 | 11.3 |

[1-8] See footnotes at bottom of Table I.
[9] Control 7 shows the instance where the additive was not used.

TABLE IV.—VARIATIONS IN AMOUNT ADDED

| Experiment No. | Additive [1] | Amount added of additive [2] | High vacuum [3] | Intrinsic viscosity of polyethylene terephthalate [4] | High vacuum [5] | Intrinsic viscosity of resulting polyethylene terephthalate [6] | Softening point [7] | Free carboxyl group [8] |
|---|---|---|---|---|---|---|---|---|
| Example: | | | | | | | | |
| 29 | [103] n=5 | 2.52 (3.0) | 60 | 0.565 | 80 | 0.821 | 249.0 | 9.5 |
| 30 | [103] n=5 | 5.04 (6.0) | 60 | 0.559 | 80 | 0.818 | 247.5 | 9.3 |
| Control 12 | [103] n=5 | 5.88 (7.0) | 60 | 0.553 | 80 | 0.785 | 246.5 | 10.0 |

[1]–[8] See footnotes at bottom of Table I.

It is seen that the content of free carboxyl groups in the resulting polyethylene terephthalate of high degree of polymerization decreases as the amount added to the additive increases. However, when the amount added was too great, violent bubbling would take place during the polymerization reaction and the molten polymer after completion of the polymerization reaction was observed to contain numerous bubbles. Further, as apparent from the results shown in Table V, below, a polymer obtained in this manner did not demonstrate much improvement in its resistance to hydrolysis even though its content of free carboxyl groups was small.

Table V shows the results obtained when the change in the free carboxyl groups contents of the polymers obtained in Examples 18–30 and Controls 7–12 were investigated after being molded into chips 2 mm. x 2 mm. x 4 mm. and submitted to hydrolysis for 2 hours under the conditions of 150° C. and 100° RH.

Table V.—Free Carboxyl group content after hydrolysis

Sample:
Control:                                               Eqivalent/$10^6$ g.
  7 _____ 52.8
  8 _____ 50.5
Example:
  18 _____ 35.2
  19 _____ 30.1
  20 _____ 27.5
  21 _____ 23.5
  22 _____ 20.0
  23 _____ 19.5
  24 _____ 21.5
Control:
  9 _____ 29.5
  10 _____ 48.6
Example 25 _____ 22.5
Control 11 _____ 54.5
Example:
  26 _____ 35.8
  27 _____ 28.5
  28 _____ 22.5
  29 _____ 23.0

Sample:
Example:                                      Equivalent/$10^6$ g.
  30 _____ 27.3
Control 12 _____ 31.8

The polyethylene ethylidene malonate (additive [103]) used in Example 26, as in the case with the synthesis of polytetramethylene oxalate (additive [73] used in the hereinafter given Example 41, was synthesized by polymerizing a monomer obtained by ester-interchange and a precondensation product, using a titanium catalyst.

EXAMPLES 31–39 AND CONTROL 13

122 parts of dimethyl-2,6-dinaphthalene carboxylate, 69 parts of ethylene glycol, 0.04 part of antimony trioxide and 0.049 part of zinc acetate were charged to a fractionating column-equipped reactor and reacted by heating, the methanol formed being distilled off externally of the system. After the internal temperature reached 230° C., the reaction product (precondensation reaction product) was transferred to another reactor. Next, after adding 0.08 part of 50% aqueous phosphorous acid solution, the internal temperature was gradually raised to 260° C. over a period of about 30 minutes and the reaction was carried out under a vacuum of 20 mm. Hg with stirring. This was followed by rapidly raising the internal temperature to 285° C. and carrying out the reaction for 60 minutes under a high vacuum of 0.1–0.2 mm. Hg. with stirring. The pressure was then returned to normal atmospheric pressure and one of the various additive was added at once to the system, and the reaction under high vacuum was continued for another 30 minutes under identical conditions.

The class and amount added of the additive during the course of the hereinabove described reaction, the intrinsic viscosity of the polyethylene-2,6-dinaphthalate at the time of addition of the additive and the intrinsic viscosity of the resulting polyethylene-2,6-dinaphthalate and its free carboxyl group content are shown in Table VI.

The values of intrinsic viscosity and free carboxyl group content of polyethylene (napthalene-2,6-dicarboxylate) in the case of Control 13 are those of the instance where the polymerization reaction was carried out for 90 minutes under a high vacuum of 0.1–0.2 mm. Hg without adding an additive.

TABLE VI

| Experiment No. | Additive [1] | Amount added of additive [2] | High vacuum [3] | Intrinsic viscosity of polyethylene [4] | High vacuum [5] | Intrinsic viscosity of resulting polyethylene [6] | Softening point [7] | Free carboxyl group [8] |
|---|---|---|---|---|---|---|---|---|
| Example: | | | | | | | | |
| 31 | [1] | 0.89 (1.0.) | 60 | 0.562 | 30 | 0.723 | 272.9 | 10.3 |
| 32 | [7] | 0.85 (0.5.) | 60 | 0.552 | 30 | 0.703 | 272.8 | 15.1 |
| 33 | [19] | 1.16 (2.0.) | 60 | 0.572 | 30 | 0.742 | 272.7 | 11.2 |
| 34 | [27] | 0.55 (0.5.) | 60 | 0.563 | 30 | 0.715 | 272.7 | 16.2 |
| 35 | [50] | 0.55 (0.5.) | 60 | 0.568 | 30 | 0.718 | 272.9 | 14.2 |
| 36 | [63] | 0.54 (0.5.) | 60 | 0.582 | 30 | 0.722 | 272.7 | 13.8 |
| 37 | [71] n=5 | 0.64 (1.0.) | 60 | 0.577 | 30 | 0.755 | 272.6 | 8.2 |
| 38 | [80] n=2 | 1.75 (1.0.) | 60 | 0.559 | 30 | 0.701 | 272.8 | 11.5 |
| 39 | [90] n=10 | 1.12 (1.0.) | 60 | 0.571 | 30 | 0.751 | 272.8 | 9.5 |
| Control 13 [9] | | | 90 | 0.715 | | | 272.9 | 32.5 |

[1] n Indicates the degree of polymerization of the additive.
[2] [Part and (mol percent based on naphthalene 2,6-dicarboxylic acid component)].
[3] Reaction time before addition of additive (minutes).
[4] Naphthalene-2,6-dicarboxylate at time of addition of additive.
[5] Reaction time after addition of additive (minutes).
[6] (Naphthalene-2,6-dicarboxylate) of high degree of polymerization.
[7] Resulting polyethylene (naphthalene-2,6-dicarboxylate) of high degree of polymerization (° C.).
[8] Content of resulting polyethylene (naphthalene-2,6-dicarboxylate) of high degree of polymerization.
[9] Control 13 shows the instance when the additive was not used.

The bis - 4 - hydroxymethylcyclohexylmethyl oxalate (additive [7]), bis-gama-hydroxypropyl malonate (additive [27]), bis-beta-hydroxyethylethyl malonate (additive [50]) and bis-beta-hydroxyethylethylidene malonate (additive [63]) used in Examples 32, 34, 35 and 36 were synthesized by the ester-interchange method using calcium acetate as the catalyst as in the case of the synthesis of the hereinbefore described bis-beta-hydroxyethyl oxalate (additive [1]).

On the other hand, the polyethylene benzyl malonate (additive [90]) used in Example 39, as in the case with the synthesis of the polytetramethylene oxalate (additive [73]) used in the hereinafter given Example 41, was synthesized by polymerizing a monomer obtained by the ester-interchange reaction and a precondensation product, using a titanium catalyst.

EXAMPLES 40–43 AND CONTROL 14

98 parts of methyl beta-hydroxyethoxybenzoate, 62 parts of ethylene glycol, 0.04 part of antimony trioxide and 0.03 part of zinc acetate were charged to a fractionating column-equipped reactor and heated, the methanol formed being distilled off externally of the system. After the distillation of the methanol was completed, the excess glycol started to distill off; this also was eliminated externally of the system. After the internal temperature reached 230° C., the reaction product was transferred to another reactor where the internal temperature was gradually raised to 260° C. and the reaction was carried out under a vacuum of 20 mm. Hg. Next, the internal temperature was rapidly raised to 275° C. and the reaction was carried out for 6 hours under a high vacuum of 0.1–1 mm. Hg with stirring. The reaction system was then returned to normal atmospheric pressure with nitrogen and, after adding the additive in a prescribed amount, the reaction was continued for another two hours under reduced pressure. The results obtained are shown in Table VII.

The intrinsic viscosity attained and the free carboxyl group content of Control 14 were the result of carrying out the reaction for 8 hours at 275° C. and a high vacuum of 0.1–1 mm. Hg without the addition of an additive.

The polytetramethylene oxalate (additive [73]) used in Example 41 was obtained in the following manner. A mixture of 146 parts of diethyl oxalate and 135 parts of tetramethylene glycol was charged to a reactor to which was then added 0.18 part of titanium tetrabutoxide. Since ethanol started to distill off at the point where the reaction temperature reached 140° C., the ethanol formed was continuously distilled off externally of the system. (Distillate in an amount near that of theoretical was produced during a reaction time of 130 minutes. While the distillate was predominantly ethanol, it was noted that about 10% of tetrahydrofuran had also been distilled.) The reaction mixture was then transferred to another reactor, and by carrying out the polymerization reaction at 230° C. first for 20 minutes at 20 mm. Hg and then for 80 minutes under a high vacuum of 0.1 mm. Hg the intended polytetramethylene oxalate was obtained. When the intrinsic viscosity of this polymer was measured by dissolving the polymer in orthochlorophenol, requiring 90 minutes for its dissolution, and then measured at 35° C., the value obtained was 0.20.

EXAMPLES 44–51 AND CONTROLS 15–17

Polyethylene terephthalate of high degree of polymerization was prepared using a continuous polymerization and spinning apparatus.

83 parts of terephthalic acid, 70 parts of ethylene glycol and 0.05 part of manganese acetate were continuously charged to an esterification reactor. After carrying out the esterification reaction at 240° C. under superatmospheric pressure, 0.06 part of tri-beta-hydroxyethyl phosphate dissolved in ethylene glycol was added at this temperature followed by the addition of an ethylene glycol solution of 0.04 part of antimony trioxide. The reaction mixture was then transferred to a polymerization vessel and the pressure of the reaction system was gradually reduced to 0.5 mm. Hg. In the meanwhile the polymerization temperature was raised from 240° to 280° C., after which the polymerization reaction was carried out for 4 hours with a polymerization temperature of 280 C. and a pressure of the reaction system of 0.5–1.0 mm. Hg. At this point the additive was introduced continuously to the reaction system in a molten state from an adding device. The polymerization reaction was then continued for a further 3–4 hours at 280° C. under a reduced pressure of 0.5–1.0 mm. Hg.

The molten polymer was then directly fed continuously to a melt-spinning apparatus and spun into filaments. The so-spun filaments were drawn 4.9× at 90° C., then 1.2× at 180° C. and thereafter heat set. The so-obtained yarn was twisted in customary manner and a tire-reinforcing cord was obtained.

The wet-heat resistance of tire cord was determined in the following manner. After conditioning the humidity of a sample for 48 hours at 25° C. and 65% RH, it is placed in a sealed tube and heated for 48 hours at 150° C. The retention of strength (kg.) of the sample, as calculated from the following expression, was considered to be the wet-heat resistance of tire cord.

Strength (kg.) retention $$= \left[ \left( \frac{\text{strength of tire cord after wet-heat resistance test}}{\text{strength of tire cord before wet-heat resistance test}} \right) \right] \times 100$$

The results obtained by carrying out the polymerization reactions using the additives and the results of the wet-heat resistance test of the tire cord obtained are shown in Tables VIII and IX, respectively.

TABLE VII

| Experiment No. | Additive [1] | | Amount added of additive [2] | High vacuum [3] | Intrinsic viscosity of polyethylene terephthalate [4] | High vacuum [5] | Intrinsic viscosity of resulting polyethylene terephthalate [6] | Softening point [7] | Free carboxyl group [8] |
|---|---|---|---|---|---|---|---|---|---|
| Example: | | | | | | | | | |
| 40 | [1] | | 0.45 (0.5) | 360 | 0.615 | 120 | 0.681 | 206.3 | 14.3 |
| 41 | [73] | n=10 | 0.76 (1.0) | 360 | 0.611 | 120 | 0.705 | 207.2 | 13.5 |
| 42 | [86] | n=5 | 0.71 (1.0) | 360 | 0.592 | 120 | 0.721 | 206.9 | 12.7 |
| 43 | [92] | n=5 | 1.20 (1.0) | 360 | 0.583 | 120 | 0.710 | 206.8 | 12.9 |
| Control 14 [9] | | | | 480 | 0.697 | | | 207.0 | 31.5 |

[1]–[8] See footnotes at bottom of Table I.
[9] Control 14 shows the instance where the additive was not added.

TABLE VIII.—RESULTS OF CONTINUOUS POLYMERIZATION REACTIONS

| Experiment No. | Additive [1] | Amount added of additive [2] | Intrinsic viscosity of polyethylene terephthalate [3] | High vacuum [4] | Intrinsic viscosity of resulting polyethylene terephthalate [5] | Content [6] | Free carboxyl group [7] |
|---|---|---|---|---|---|---|---|
| Example: | | | | | | | |
| 44 | [71] n=3 | 0.34 (0.5) | 0.625 | 180 | 0.852 | <0.10 | 17.2 |
| 45 | [71] n=3 | 0.68 (1.0) | 0.621 | 180 | 0.842 | <0.10 | 14.1 |
| 46 | [71] n=3 | 2.05 (3.0) | 0.625 | 180 | 0.845 | 0.42 | 13.1 |
| 47 | [71] n=3 | 2.05 (3.0) | 0.615 | 240 | 0.875 | <0.10 | 15.2 |
| 48 | [71] n=3 | 4.10 (6.0) | 0.610 | 180 | 0.852 | 1.51 | 10.3 |
| 49 | [71] n=3 | 4.10 (6.0) | 0.612 | 240 | 0.881 | 0.82 | 12.5 |
| Control: | | | | | | | |
| 15 | [71] n=3 | 5.47 (8.0) | 0.621 | 240 | 0.875 | 1.24 | 15.3 |
| 16 [8] | | | 0.615 | 180 | 0.835 | | 33.5 |
| 17 [8] | | | 0.621 | 240 | 0.851 | | 35.0 |
| Example: | | | | | | | |
| 50 | [90] n=5 | 1.13 (1.0) | 0.615 | 240 | 0.855 | <0.1 | 13.1 |
| 51 | [90] n=5 | 6.78 (6.0) | 0.621 | 240 | 0.835 | 1.2 | 12.5 |

[1] n indicates the degree of polymerization of the additive.
[2] [Part and (mol percent based on terephthalic acid component)].
[3] At time of addition of additive.
[4] Reaction time after addition of additive (minutes).
[5] High degree of polymerization.
[6] Of oxalic or malonic acid (or substituted products thereof) in resulting polyethylene terephthalate of high degree of polymerization, the content of oxalic or malonic acid or (substituted products thereof) was determined by gas chromatography after decomposition of the sample with methanol. (Based on terephthalic acid.)
[7] Content of resulting polyethylene terephthalate of high degree of polymerization.
[8] Controls 16 and 17 are instances in which the additive was not used.

TABLE IX.—WET-HEAT RESISTANCE TEST RESULTS OF TIRE CORD

| Sample | Strength of tire cord before wet-heat resistance test (kg./2,000 de.) | Strength retention after wet-heat resistance test (percent) |
|---|---|---|
| Example: | | |
| 44 | 15.1 | 87 |
| 45 | 14.8 | 88 |
| 46 | 15.2 | 83 |
| 47 | 15.3 | 87 |
| 48 | 15.1 | 80 |
| 49 | 15.1 | 83 |
| Control: | | |
| 15 | 15.2 | 76 |
| 16 | 15.0 | 74 |
| 17 | 14.9 | 70 |
| Example: | | |
| 50 | 14.9 | 90 |
| 51 | 15.1 | 82 |

Next, the relationship between the results of wet-heat resistance of a tire cord and its resistance to hydrolysis was investigated.

Hydrolysis of the filaments immediately after spinning was carried out for 2 hours at 150° C. and 100% RH and the increase in the free carboxyl group content was investigated with the results shown in Table X.

TABLE X

Sample: Content of free carboxyl groups after hydrolysis (equivalent/$10^6$ g.)

Example:
44 ............................................. 33.9
45 ............................................. 25.7
46 ............................................. 27.8
47 ............................................. 26.6
48 ............................................. 26.3
49 ............................................. 27.4

Control:
15 ............................................. 32.5
16 ............................................. 45.1
17 ............................................. 50.2

Example:
50 ............................................. 25.2
51 ............................................. 28.3

It can be seen that there exists a good correlation between the results of wet-heat resistance measurements of a tire cord and the stability against hydrolysis of the undrawn filaments. Further, it can be seen that the lesser the copolymerization of oxalic or malonic acid (or substituted products thereof), the better the wet-heat resistance.

EXAMPLES 52–58

97 parts of dimethyl terephthalate, 69 parts of ethylene glycol, 0.04 part of antimony trioxide and 0.088 part of calcium acetate were charged to a fractionating column-equipped reactor and reacted by heating, the methanol formed being distilled off externally of the system. After the completion of the distillation of the methanol, the distillation of glycol started; this also was eliminated externally of the system. After the internal temperature reached 230° C., the reaction product (precondensation reaction product) was transferred to another reactor. Next, after adding 0.08 part of 50% aqueous phosphorous acid solution, the internal temperature was gradually raised to 270° C. over a period of about 30 minutes while the reaction was carried out under a vacuum of 20 mm. Hg and agitation of 60 r.p.m. This was followed by raising the internal temperature rapidly to 280° C. and conducting the reaction under a high vacuum of 0.1–0.3 mm. Hg. After continuing the reaction under these conditions for 80 minutes, the pressure was returned to normal atmospheric pressure with nitrogen and sampling was performed. The intrinsic viscosity of the polymer at this time was 0.60–0.66. An additive indicated in Table XI was added to this molten polymer in an amount prescribed in the table and, after mixing with the polymer for 10 minutes under a nitrogen stream at normal pressure, the reaction was continued for 20–40 minutes under a high vacuum of 0.1–1 mm. Hg, following which the reaction system was again returned to normal atmospheric pressure and the resulting polymer was discharged into cold water and cut into small pieces having the approximate width, length and thickness of 3 mm. x 3 mm. x 2 mm.

The polymer chips obtained as above described were dried for 3 hours under a nitrogen stream at 160° C., after which the polymerization reaction was carried out for 6 hours in the solid phase under a nitrogen stream, with the results shown in Table XI.

TABLE XI

| Experiment No. | Additive[1] | Amount added of additive[2] | | Intrinsic viscosity of polyethylene terephthalate[3] | COOH content of starting polymer | Intrinsic viscosity of polyethylene terephthalate[4] | Carboxyl group[5] |
|---|---|---|---|---|---|---|---|
| Example: | | | | | | | |
| 52 | [1] | | 0.45 (0.5) | 0.627 | 10.9 | 0.906 | 5.3 |
| 53 | [19] | | 1.16 (2.0) | 0.653 | 7.3 | 0.918 | 1.5 |
| 54 | [19] | | 0.58 (1.0) | 0.655 | 9.7 | 0.932 | 4.3 |
| 55 | [26] | | 0.48 (0.5) | 0.625 | 11.7 | 0.919 | 5.3 |
| 56 | [49] | | 0.51 (0.5) | 0.628 | 13.2 | 0.928 | 8.7 |
| 57 | [71] | $n=10$ | 0.61 (1.0) | 0.652 | 9.7 | 0.920 | 4.9 |
| 58 | [86] | $n=50$ | 0.66 (1.0) | 0.659 | 14.2 | 0.958 | 8.9 |

[1] The intrinsic viscosity of polyethylene terephthalate was obtained by dissolving the polymer in a mixed solvent of 6 parts of phenol and 4 parts of tetrachloroethane (the dissolution requiring 45 minutes at 140° C.) after which the measurement was made at 35° C.
[2] [Part and (mol percent based on terephthalic acid component).]
[3] Before the solid phase polymerization reaction.
[4] After the solid phase polymerization reaction.
[5] Content of resulting polyethylene terephthalate obtained by the solid phase polymerization reaction.

The bis-beta-hydroxyethylmethyl malonate (additive [49]) used in Example 56 was synthesized by the ester-interchange reaction using calcium acetate as the catalyst as in the case with the synthesis of the previously mentioned bis-beta-hydroxyethyl oxalate (additive [1]).

Control XVIII 97 parts of dimethyl terephthalate, 69 parts of ethylene glycol, 0.04 part of antimony trioxide and 0.88 part of calcium acetate were charged to a fractionating column-equipped reactor and reacted by heating, the methanol formed being distilled off externally of the system. After completion of the distillation of the methanol, the distillation of the excess ethylene glycol followed; so this also was eliminated externally of the system. At the point where the internal temperature reached 230° C., the reaction product (precondensation reaction product) was transferred to another reactor. Next, after adding 0.08 part of 50% aqueous phosphorous acid solution, the internal temperature was gradually raised to 270° C. over a period of about 30 minutes while the reaction was carried out under a vacuum of 20 mm. Hg at an agitation of 60 r.p.m., followed by rapidly raising the internal temperature to 280° C. and continuing the reaction for another 70 minutes under a high vacuum of 0.1–0.3 mm. Hg. The resulting polymer was discharged into cold water and cut into small pieces having the approximate width, length and thickness of 3 mm. x 3 mm. x 2 mm. The intrinsic viscosity of this starting polymer was 0.609 and its terminal carboxyl group content was 29.5 equivalent/10⁶ gram polymer.

After drying this polymer for 3 hours at 160° C. under a nitrogen stream, it was submitted to a solid phase polymerization reaction for 6 hours at 230° C. under normal pressure while passing a nitrogen stream through, with the consequence that the intrinsic viscosity of the resulting polyester was 0.929 and its terminal carboxyl group content was 21.0 equivalent/10⁶ gram polymer.

EXAMPLES 59–80 AND CONTROLS 19–21

Instances in which the class of the additives are varied are shown.

A fractionating column-equipped reactor was charged with 97 parts of dimethyl phthalate, 65 parts of ethylene glycol, 0.04 part of antimony trioxide and 0.088 part of calcium acetate. The mixture was heated and the methanol formed was distilled off externally of the system. After the methanol was completely distilled off, the excess glycol started to distill off; this also was eliminated externally of the system. After the internal temperature reached 230° C., the reaction product (precondensation reaction product) was transferred to another reactor. Next, after adding 0.08 part of 50% aqueous phosphorous acid solution, the internal temperature was gradually raised to 260° C. over a period of about 30 minutes, while the reaction was carried out under a reduced pressure of 20 mm. Hg with stirring. This was followed by raising the internal temperature rapidly to 278° C. and continuing the reaction for a further 60 minutes under a high vacuum of 0.1–1 mm. Hg with stirring. At this point the reaction system was returned to normal atmospheric pressure and one of the various additives was added in a prescribed amount, followed by again reducing the pressure of the reaction system and continuing the reaction for a further 90 minutes.

The intrinsic viscosity of the polyethylene terephthalate at the time of the addition of the additive during the course of the foregoing reaction, the amount added of the additive, as well as the intrinsic viscosity of the polyethylene terephthalate after completion of the overall reaction and the free carboxyl group content are shown in Table XII.

TABLE XII

| Experiment No. | Additive[1] | Amount added of additive[2] | | High vacuum[3] | Intrinsic viscosity of polyethylene terephthalate[4] | High vacuum[5] | Intrinsic viscosity of resulting polyterephthalate[6] | Free carboxyl group[7] |
|---|---|---|---|---|---|---|---|---|
| Example: | | | | | | | | |
| 59 | [1] | | 0.45 (0.5) | 60 | 0.555 | 90 | 0.813 | 15.2 |
| 60 | [6] | | 0.72 (0.5) | 60 | 0.559 | 90 | 0.798 | 14.5 |
| 61 | [9] | | 0.68 (0.5) | 60 | 0.559 | 90 | 0.811 | 14.8 |
| 62 | [14] | | 1.06 (0.5) | 60 | 0.549 | 90 | 0.829 | 15.3 |
| 63 | [18] | | 1.65 (0.5) | 60 | 0.547 | 90 | 0.806 | 13.6 |
| 64 | [19] | | 1.16 (2.0) | 60 | 0.558 | 90 | 0.825 | 10.2 |
| 65 | [26] | | 0.48 (0.5) | 60 | 0.562 | 90 | 0.800 | 11.7 |
| 66 | [32] | | 0.72 (0.5) | 60 | 0.549 | 90 | 0.809 | 12.4 |
| 67 | [49] | | 0.52 (0.5) | 60 | 0.537 | 90 | 0.807 | 12.5 |
| 68 | [52] | | 0.59 (0.5) | 60 | 0.557 | 90 | 0.817 | 11.0 |
| 69 | [59] | | 0.55 (0.5) | 60 | 0.550 | 90 | 0.827 | 13.9 |
| 70 | [65] | | 0.70 (0.5) | 60 | 0.553 | 90 | 0.811 | 13.0 |
| 71 | [71] | $n=10$ | 0.61 (1.0) | 60 | 0.549 | 70 | 0.817 | 10.3 |
| 72 | [73] | $n=60$ | 0.69 (1.0) | 60 | 0.552 | 70 | 0.827 | 10.6 |
| 73 | [77] | $n=10$ | 0.91 (1.0) | 60 | 0.527 | 70 | 0.809 | 11.0 |
| 74 | [78] | $n=5$ | 0.93 (1.0) | 60 | 0.542 | 70 | 0.825 | 11.5 |
| 75 | [86] | $n=10$ | 0.68 (1.0) | 60 | 0.533 | 70 | 0.822 | 14.6 |

TABLE XII—Continued

| Experiment No. | Additive[1] | | Amount added of additive[2] | High vacuum[3] | Intrinsic viscosity of polyethylene terephthalate[4] | High vacuum[5] | Intrinsic viscosity of resulting polyterephthalate[6] | Free carboxyl group[7] |
|---|---|---|---|---|---|---|---|---|
| 76 | [86] | n=60 | 0.65 (1.0) | 60 | 0.527 | 70 | 0.831 | 10.9 |
| 77 | [89] | n=50 | 1.44 (2.0) | 60 | 0.533 | 70 | 0.825 | 9.5 |
| 78 | [91] | n=2 | 1.15 (1.0) | 60 | 0.529 | 70 | 0.785 | 18.6 |
| 79 | [104] | n=20 | 1.10 (1.0) | 60 | 0.552 | 70 | 0.842 | 11.3 |
| 80 | [107] | n=3 | 1.37 (1.0) | 60 | 0.539 | 70 | 0.795 | 14.0 |
| Control: | | | | | | | | |
| 19 | Dimethyl oxalate | | 0.30  0.05 | 60 | 0.542 | 90 | 0.625 | 19.6 |
| 20 | ([8]) | | 0.34  0.05 | 60 | 0.548 | 90 | 0.780 | 32.5 |
| 21 | ([9]) | | 0.47  0.05 | 60 | 0.529 | 90 | 0.618 | 20.2 |

[1] n Indicates the degree of polymerization of the additive.
[2] [Part and (mol percent based on terephthalic acid component).]
[3] Reaction time before addition of additive (min).
[4] At time of addition of additive.
[5] Reaction time after addition of additive (minute).
[6] High degree of polymerization.
[7] Content of resulting polyethylene terephthalate of high degree of polymerization.
[8] Monohydroxyethyl ester of oxalic acid.
[9] Diisopropyl ester of malonic acid.

As shown by the control experiments, it can be seen that the dialkyl esters and monohydroxyethyl esters of oxalic or malonic acid are not desirable as additives.

As to the bis (4-hydroxyphenyl) oxalate (additive [9]) used in Example 61, it was obtained in the following manner. 12.7 parts of oxalyl chloride were dissolved in 50 parts of well dried acetone, to which then was added at once a solution in 100 parts of acetone of 22 parts of dry hydroquinone recrystallized from water, after which the reaction was carried out for 6 hours at the reflux temperature of acetone. This was followed by distilling off the acetone at normal pressure and thereafter recrystallizing the resulting crystals from a 3:1 (wt. ratio) acetone:ethyl ether mixture. On the other hand, the bis 4-(hydroxyphenyl) phenyl oxalate (additive [14]) and the bis-(4-hydroxy phenyl) malonate (additive [32]) used in Examples 62 and 66 were also synthesized by means of the acid chloride method in like manner.

(additive [18]) and bis-beta-hydroxyethyldimethyl malonate (additive [59]) used in Examples 63 and 69 were synthesized by the ester-interchange method using calcium acetate as catalyst as in the case with the synthesis of the previously mentioned bis-beta-hydroxyethyl oxalate (additive [1]).

The poly-1,4-cyclohexyl oxalate (additive [77]), polyethylene methyl malonate (additive [89]), polytetramethylenedimethyl malonate (additive [91]) and polyethylenebenzyldene malonate (additive [104]) used in Examples 73, 77, 78 and 79 were obtained by polymerizing a monomer obtained by ester-interchange and a precondensation product as in the case with the synthesis of the previously mentioned polytetramethylene oxalate (additive [73]).

The poly-1,4-phenylene oxalate (additive [78]) used in Example 74 was obtained in the following manner. A reactor sealed with a dry tube so as to ensure that the moisture contained in the air does not enter was charged with 47 parts of hydroquinone which had been recrystallized three times from pure water, 200 parts of nitrobenzene and 30 parts of oxalyl chloride, after which the reaction was carried out for 18 hours at 60° C. After completion of the reaction, the nitrobenzene was distilled off under a reduced pressure of 1 mm. Hg and the remaining solid was dried. The intrinsic viscosity of this polymer in orthochlorophenol was 0.08.

EXAMPLES 81–83

Instances in which copolymers have been used as the additive are shown.

97 parts of dimethyl terephthalate, 69 parts of ethylene glycol, 0.04 part of antimony trioxide and 0.088 part of calcium acetate were charged to fractionating column-equipped reactor and heated, the methanol formed being distilled off externally of the system. After the distillation of the methanol was completed, the excess glycol started to distill off; so this also was eliminated externally of the system. After the internal temperature reached 230° C., The compound 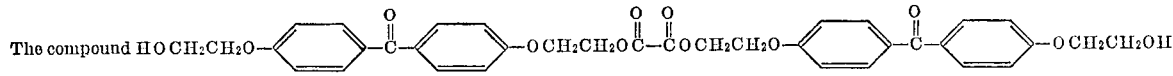

the reaction product (precondensation reaction product) was transferred to another reactor. Next, after adding 0.080 part of 50% aqueous phosphorous acid solution, the internal temperature was gradually raised to 260° C. over a period of about 30 minutes, while the reaction was carried out under a reduced pressure of 20 mm. Hg with stirring. The internal temperature was then raised rapidly to 280° C. where the reaction was continued for a prescribed period of time under a high vacuum of 0.1–1 mm. Hg with stirring, after which the pressure was returned to normal atmospheric pressure and one of the various additives was added at once to the reaction system in a prescribed amount. The reaction was then continued further at 280° C. and a high vacuum of 0.1–mm. Hg until the intrinsic viscosity of the polyethylene terephthalate became at least 0.75.

The copolymeric ratio of the oxalic acid component contained in the copolymer used as the additive in the course of the foregoing reaction, the amount of copolymer added, the intrinsic viscosity of the polyethylene terephthalate at the time of the addition of the additive and the free carboxyl group content are shown in Table XIII.

TABLE XIII

| Experiment No. | Additive | | Amount added of additive[1] | High vacuum[2] | Intrinsic viscosity of polyethylene terephthalate[3] | High vacuum[4] | Intrinsic viscosity of resulting polyethylene terephthalate[5] | Softening point of resulting polyethylene terephthalate[6] | Free carboxyl group[7] |
|---|---|---|---|---|---|---|---|---|---|
| Example: | | | | | | | | | |
| 81 | ([8]) | (1/10) | 10.5 (1.0) | 60 | 0.554 | 80 | 0.756 | 261.9 | 15.8 |
| 82 | ([8]) | (1/3) | 3.6 (1.0) | 60 | 0.555 | 80 | 0.783 | 262.0 | 13.2 |
| 83 | ([8]) | (1/1) | 1.6 (1.0) | 60 | 0.551 | 80 | 0.825 | 262.0 | 10.1 |

[1] [Part and (mol percent based on terephthalic acid component).]
[2] Reaction time before addition of additive (minutes).
[3] At time of addition of additive.
[4] Reaction time after addition of additive (minutes).
[5] High degree of polymerization.
[6] High degree of polymerization (° C.).
[7] Content of resulting polyethylene terephthalate of high degree of polymerization.
[8] Polyethylene oxalateterephthalate copolyester.

It thus can be seen that better results are obtained when an additive in which the copolymeric proportion of oxalic acid is greater is used.

The method of synthesizing the additives used in Examples 81–83 will now be described.

97 parts of dimethyl terephthalate, 69 parts of ethylene glycol, 0.04 part of antimony trioxide and 0.088 part of calcium acetate were charged to a fractionating column-equipped reactor and heated, the methanol formed being distilled off. Upon completion of the distillation of the methanol, the distillation of the excess glycol started; this also was distilled off externally of the system. After the internal temperature reached 230° C., the reaction product (precondensation reaction product) was transferred to another reactor. Next, 0.080 part of 50% aqueous phosphorous acid solution was added, and the internal temperature was slowly raised to 260° C. and the reaction was carried out under a reduced pressure of 20 mm. Hg with stirring. The reaction temperature was then reduced to 230° C. and the pressure of the reaction system was returned to atmospheric pressure with nitrogen to thus obtain bis-beta-hydroxyethyl terephthalate.

Bis-beta-hydroxyethyl oxalate was added to the so obtained bis-beta-hydroxyethyl terephthalate in the amount of 1/10, 1/3 and 1/1 molar quantity respectively based on the terephthalic acid component of the terephthalate, following which the reaction temperature was again reduced to 200° C. while concurrently and gradually reducing the pressure of the reaction system, and the polymerization reaction was carried out for 30 minutes at a reduced pressure of 15–20 mm. Hg. The copolymer obtained in this manner had a degree of polymerization of about 10.

EXAMPLES 84–86

122 parts of dimethyl-2,6-naphthalenedicarboxylate, 69 parts of ethylene glycol, 0.04 part of antimony trioxide and 0.088 part of calcium acetate were charged to a fractionating column-equipped reactor and heated, the methanol formed being distilled off externally of the system. After the distillation of the methanol was completed, the excess glycol started to distill off; this also was eliminated externally of the system. After the internal temperature reached 230° C., the reaction product (precondensation reaction product) was transferred to another reactor. Next, after adding 0.08 part of 50% aqueous phosphorous acid, the internal temperature was gradually raised to 260° C. over a period of about 30 minutes while the reaction was carried out under a reduced pressure of 20 mm. Hg with stirring. This was followed by rapidly raising the internal temperature to 285° C. and continuing the reaction for a further 60 minutes. Then after returning the pressure of the system to atmospheric pressure with nitrogen, an additive in a prescribed amount was added at once to the reaction system, following which the reaction was carried out for another 30 minutes with stirring at 285° C. and a high vacuum of 0.1–1 mm. Hg. The intrinsic viscosity of the polyethylene-2,6-naphthalenedicarboxylate at the time of the addition of the additive during the course of the foregoing reaction, the amount of additive added and the intrinsic viscosity of the polyethylene - 2,6 - napthalenedicarboxylate after completion of the overall reaction are shown in Table XIV.

TABLE XIV

| Experiment No. | Additive | | Amount added of additive[1] | High vacuum[2] | Intrinsic viscosity of polyethylene-2,6-naphthalene dicarboxylate[3] | High vacuum[4] | Intrinsic viscosity of polyethylene-2,6-naphthalene dicarboxylate[5] | Softening point[6] | Free carboxyl group[7] |
|---|---|---|---|---|---|---|---|---|---|
| Example: | | | | | | | | | |
| 84 | ([8]) | (1/10) | 13.2 (1.0) | 60 | 0.561 | 30 | 0.651 | 272.9 | 13.5 |
| 85 | ([8]) | (1/3) | 4.4 (1.0) | 60 | 0.559 | 30 | 0.681 | 273.0 | 12.5 |
| 86 | ([8]) | (1/1) | 1.9 (1.0) | 60 | 0.558 | 30 | 0.705 | 272.9 | 9.5 |

[1] [Part and (mol percent based on 2,6-naphthalene dicarboxylic acid component).]
[2] Reaction time before addition of additive (minutes).
[3] At time of addition of additive.
[4] Reaction time after addition of additive (minutes).
[5] High degree of polymerization.
[6] Resulting polyethylene-2,6-naphthalene dicarboxylate of high degree of polymerization (° C.).
[7] Content of resulting polyethylene-2,6-naphthalene dicarboxylate of high degree of polymerization.
[8] Polyethylene malonate-2,6-naphthalene dicarboxylate copolyester.

The method of synthesizing the additives used in Examples 84–86 was as follows:

122 parts of dimethyl-2,6-naphthalenedicarboxylate, 69 parts of ethylene glycol, 0.04 part of antimony trioxide and 0.088 part of calcium acetate were charged to a fractionating column-equipped reactor and heated, the methanol formed being distilled off. After the completion of the distillation of methanol, the excess glycol started to distill off; this also was eliminated externally of the system. After the internal temperature reached 230° C., the reaction product (precondensation reaction product) was transferred to another reactor. Next, 0.08 part of 50% aqueous phosphorous acid was added and the internal temperature was gradually raised to 260° C. over a period of about 30 minutes while the reaction was carried out under a reduced pressure of 20 mm. with stirring.

At this point the reaction system was returned to normal atmospheric pressure with nitrogen and the reaction temperature was lowered to 240° C. to thereby obtain bis-beta-hydroxyethyl naphthalate.

Bis-beta-hydroxyethylmethyl malonate was then added to the obtained naphthalate in an amount of 1/10, 1/3 and 1/1 molar quantities respectively based on the 2,6-naphthalenedicarboxylic acid component of said naphthalate. After again reducing the reaction temperature to 210° C. while at the same time gradually reducing the pressure of the reaction system, the polymerization reaction was carried out for 60 minutes at 10–5 mm. Hg. The degree of polymerization of the so obtained copolymer became about 7.

What is claimed is:

1. In a process for the preparation of a fiber-forming aromatic polyester which comprises reacting and polymerizing an aromatic bifunctional carboxylic acid component and a dihydroxy compound component, while releasing a 1,2-glycol, the improvement which comprises obtaining a fiber-forming aromatic polyester of low free hydroxyl content by adding to a melt of the aromatic polyester having an intrinsic viscosity of at least 0.3, said intrinsic viscosity being determined from the viscosity of ortho-chlorophenol solution of the aromatic polyester measured at 35° C., at least one additive selected from (1) at least one glycol ester of a dicarboxylic acid represented by the formula

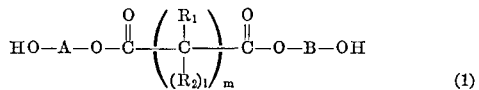
(1)

wherein A and B are divalent organic radicals which may be the same or different, and $m$ is 0 or 1, $l$ being 1 or 0 when $m$ is 1;

when $m=1$ and $l=1$, $R_1$ and $R_2$ are each independently selected from the group consisting of hydrogen, monovalent hydrocarbon residues of 1–12 carbon atoms, halogen-substituted monovalent hydrocarbon residues of 1–12 carbon atoms, the total carbon atoms of $R_1$ and $R_2$ never exceeding 12;

when $m=1$ and $l=0$, $R_1$ is selected from divalent hydrocarbon residues of 1–12 carbon atoms and halogen-substituted hydrocarbon residues of 1–12 carbon atoms; and when $m=0$, the compounds of Formula 1 may be an intramolecular ester of the formula

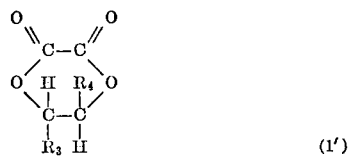
(1')

wherein $R_3$ and $R_4$ are each independently selected from the group consisting of hydrogen, monovalent hydrocarbon residues of 1–20 carbon atoms; and halogen-substituted monovalent hydrocarbon residues of 1–20 carbon atoms;

(2) at least one polyester containing at least one structural unit of the formula

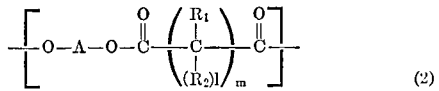
(2)

wherein A, $R_1$, $R_2$, $m$ and $l$ are as defined above; and (3) mixtures of (1) and (2);

the amounts of said additive being 0.5–6 mol percent based on the total acid component forming said aromatic polyester, the amount of said polyester of Formula 2 being calculated with one of said structural units being regarded as one molecule, and subjecting the system to further polycondensation reaction.

2. The process of claim 1 wherein said polyester of Formula 2 is formed from oxalic or optionally substituted malonic acid as the acid component and ethylene glycol as the glycol component, and is expressed by the formula

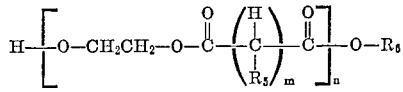

wherein $R_5$ is selected from the group consisting of hydrogen, alkyl groups of 1–7 carbon atoms, and benzyl;

$R_6$ is selected from the group consisting of hydrogen and β-hydroxyethyl;

$m$ is 0 or 1; and $n$ is a positive integer of 2–300.

3. The process of claim 1 wherein said polyester of Formula 2 is a copolyester of which at least 20 mol percent of the entire structural units are formed of the structural unit of Formula 2, and the remainder formed of ethylene terephthalate units of the formula

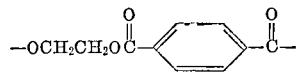

4. The process of claim 1 wherein said polyester of Formula 2 is a copolyester of which at least 20 mol percent of the entire structural units are formed of the structural units of Formula 2, and the remainder formed of ethylene naphthalene-2,6-dicarboxylate of the formula

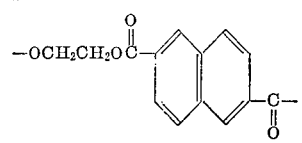

5. The process of claim 1 which comprises reacting said dicarboxylic acid component of which at least 90 mol percent is composed of terephthalic acid, naphthalene-2,6-dicarboxylic acid, or a lower aliphatic ester thereof, with said dihydroxy compound component of which at least 90 mol percent is ethylene glycol to form a fiber-forming aromatic polyester, characterized in that, when the intrinsic viscosity of the reaction product is at least 0.4, the intrinsic viscosity being determined from the viscosity of orthochlorophenol solution of the product measured at 35° C., at least one glycol ester of a dicarboxylic acid of Formula 1 or 1', or at least one polyester containing at least one structural unit of Formula 2 is added to the molten reaction product, and the system is allowed to continue polycondensation in high vacuum or inert gaseous current.

6. The process of claim 1 wherein said divalent organic radicals of A and B are selected from radicals of the formula (i) 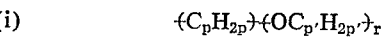

wherein $p$ and $p'$ are positive integers of 2–20, and $r$ is 0 or 1;

(ii) 

wherein $q$ is a positive integer of 6–20;

(iii) 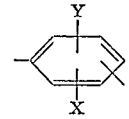

wherein X and Y are each independently selected from hydrogen, halogen and alkyl groups of 1–4 carbon atoms;

(iv) 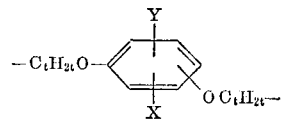

wherein X and Y are as defined above with respect to (iii) and $t$ is a positive integer of 2–4 with the proviso that the total number of carbon atoms of $C_t$, X and Y does not exceed 14;

(v) 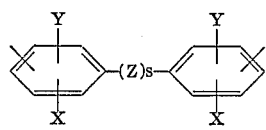

wherein X and Y area as defined above with regard to (iii), $s$ is 0 or 1, and Z is selected from the group consisting of oxygen, alkylidene groups of 1–4 carbon atoms, alkylene groups of 1–4 carbon atoms, sulfonyl and carboxyl, the total number of carbon atoms of X, Y and Z not exceeding 8;

(vi) 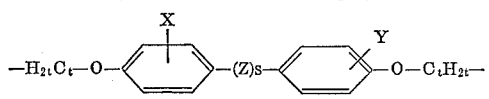

wherein X, Y, $s$ and Z are as defined above with respect to (v) and $t$ is a positive integer of 2–4, the total number of carbon atoms of $C_t$, X, Y and Z not exceeding 8.

7. The process of claim 6 wherein both A and B are ethylene groups.

8. The process of claim 1 wherein said polyester of Formula 2 is formed from oxalic or optionally substituted malonic acid as the acid component and ethylene glycol as the glycol component, and is expressed by the formula

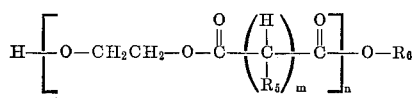

wherein $R_5$ is selected from the group consisting of hydrogen, alkyl groups of 1–7 carbon atoms and benzyl,
$R_6$ is selected from the group consisting of hydrogen and β-hydroxyethyl,
$m$ is 0 or 1, and
$n$ is a positive integer of 2–200.

9. The process of claim 1 which comprises reacting said dicarboxylic acid component of which at least 90 mol percent is composed of terephthalic acid, naphthalene-2,6-dicarboxylic acid, or a lower aliphatic ester thereof, with said dihydroxy compound component of which at least 90 mol percent is ethylene glycol to form a fiber-forming aromatic polyester, characterized in that, when the intrinsic viscosity of the reaction product is at least 0.5, the intrinsic viscosity being determined from the viscosity of ortho-chlorophenol solution of the product measured at 35° C., at least one glycol ester of a dicarboxylic acid of Formulae 1 and 1', or at least one polyester containing at least one structural unit of Formula 2 is added to the molten reaction product, and the system is allowed to continue polycondensation in high vacuum or inert gaseous current.

10. The process of claim 5 wherein the polycondensation reaction of the reaction product containing said additive in high vacuum or inert gaseous current is so controlled that the ratio of structural units of Formula 2 copolymerized into the aromatic polyester is within the range of 0–0.5 mol percent, based on the total acid component in the aromatic polyester.

11. The process of claim 1 wherein additive is present in an amount of 0.07–3 mol percent based on the total acid component forming said aromatic polyester.

12. The process of claim 1 wherein at least one of $R_1$ and $R_2$ is other than hydrogen.

13. The process of claim 1 wherein at least 90 mol percent of the entire structural units of said aromatic polyester are composed of ethylene terephthalate units.

14. The process of claim 1 wherein said aromatic polyester is polyethylene terephthalate.

15. The process of claim 1 wherein at least 90 mol percent of the entire structural units of said aromatic polyester are composed of ethylene naphthalene-2,6-dicarboxylate.

16. The process of claim 1 wherein said glycol ester of a dicarboxylic acid of Formula 1 is the diethylene glycol ester of oxalic acid.

17. The process of claim 1 wherein said glycol ester of a dcarboxylic acid of Formula 1 is a diethylene glycol ester of malonic acid or substituted malonic acid of the formula

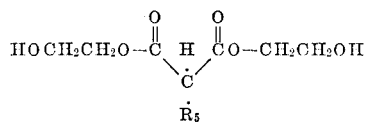

wherein $R_5$ is selected from the group consisting of hydroken, alkyl groups of 1–7 carbon atoms and benzyl.

18. The process of claim 1 wherein said glycol ester of a dicarboxylic acid of Formula 1' is cyclic ethylene oxalate.

19. The process of claim 1 wherein said polyester of Formula 2 is a copolyester of which at least 20 mol percent of the entire structural units are formed of the structural unit of Formula 2.

20. The process of claim 1 wherein said polyester of Formula 2 is a copolyester of which at least 40 mol percent of the entire structural units are formed of the structural unit of Formula 2.

21. The process of claim 1 wherein said glycol ester of Formula 1 or 1', or said polyester of Formula 2, is added in an amount of 0.07–3 mol percent based on the total acid component in the fiber-forming aromatic polyester, the amount of the polyester of Formula 2 being calculated with one of said structural units being regarded as one molecule.

22. The process of claim 2 wherein a fiber-forming aromatic polyester of the polymerization degree corresponding to an intrinsic viscosity of no less than 0.8 is produced.

23. The process of claim 1 wherein a fiber-forming aromatic polyester of free carboxyl group content not greater than 20 equivalents/$10^6$ g. of the polymer is obtained.

24. The process of claim 5, wherein the polycondensation reaction of the reaction product containing said additive in high vacuum or inert gaseous current is so controlled that the ratio of structural units of Formula 2 copolymerized into the aromatic polyester is within the range of 0–1 mol percent, based on the total acid component in the aromatic polyester.

References Cited
UNITED STATES PATENTS

| | | | |
|---|---|---|---|
| 3,396,149 | 8/1968 | Roedel et al. | 260—75 |
| 3,433,770 | 3/1969 | Shima et al. | 260—75 |

WILLIAM H. SHORT, Primary Examiner

E. WOODBERRY, Assistant Examiner

U.S. Cl. X.R.

260—75 T